(12) United States Patent
Donovan et al.

(10) Patent No.: US 7,454,634 B1
(45) Date of Patent: Nov. 18, 2008

(54) POWER SAVINGS APPARATUS AND METHOD FOR WIRELESS NETWORK DEVICES

(75) Inventors: Timothy Donovan, Livermore, CA (US); Shafiq Jamal, Gilroy, CA (US); Yonghua Song, Cupertino, CA (US); Chia-Chun Chung, San Jose, CA (US); Tam Tran, San Ramon, CA (US); Lawrence Tse, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 356 days.

(21) Appl. No.: 11/070,481

(22) Filed: Mar. 2, 2005

Related U.S. Application Data

(63) Continuation-in-part of application No. 10/650,887, filed on Aug. 28, 2003.

(51) Int. Cl.
*G06F 1/32* (2006.01)
(52) U.S. Cl. .................................. 713/322; 713/323
(58) Field of Classification Search ................. 713/322, 713/323
See application file for complete search history.

(56) References Cited

U.S. PATENT DOCUMENTS

| | | | |
|---|---|---|---|
| 5,774,813 A | 6/1998 | Jokinen | 455/574 |
| 5,845,204 A | 12/1998 | Chapman et al. | |
| 5,870,680 A | 2/1999 | Guerlin et al. | 455/557 |
| 6,011,383 A | 1/2000 | Dean et al. | |
| 6,029,061 A | 2/2000 | Kohlschmidt | 455/574 |
| 6,282,661 B1 | 8/2001 | Nicol | |
| 6,523,128 B1 | 2/2003 | Stapleton et al. | |
| 6,618,814 B1 * | 9/2003 | Gaur et al. | 713/323 |
| 6,763,471 B1 * | 7/2004 | Aoyama | 713/320 |
| 6,934,870 B1 | 8/2005 | Amos | 713/501 |
| 6,944,432 B2 | 9/2005 | Pohjonen | 455/260 |
| 6,976,181 B2 * | 12/2005 | Dai et al. | 713/320 |
| 7,142,009 B1 * | 11/2006 | Watt et al. | 326/38 |
| 7,260,731 B1 * | 8/2007 | Read et al. | 713/320 |
| 2001/0010457 A1 | 8/2001 | Kobayashi et al. | 323/266 |
| 2002/0138778 A1 * | 9/2002 | Cole et al. | 713/330 |
| 2003/0025800 A1 | 2/2003 | Hunter et al. | |
| 2003/0044005 A1 | 3/2003 | Lee et al. | |

(Continued)

FOREIGN PATENT DOCUMENTS

WO    WO 02/082248 A2    10/2002

OTHER PUBLICATIONS

IEEE P802.11, Information Technology—Telecommunications and information exchange between systems—Local and metropolitan area networks—Specific requirements—Part 11: Wireless LAN Medium Access Control (MAC) and Physical Layer (PHY) specifications, 1999, 531 pages.

(Continued)

*Primary Examiner*—Thuan N Du

(57) ABSTRACT

A wireless network device having active and inactive modes comprises a clock generating module that generates a first clock signal having a first clock rate. A voltage supply module generates a first voltage level and a second voltage level that is less than the first voltage level. A first digital module receives the first clock rate and the first voltage level during the active mode, receives the second voltage level during the inactive mode and does not receive the first clock signal during the inactive mode. A first analog module communicates with the voltage supply module and has reduced current consumption during the inactive mode.

32 Claims, 16 Drawing Sheets

U.S. PATENT DOCUMENTS

| | | |
|---|---|---|
| 2003/0065960 A1 | 4/2003 | Rusu et al. |
| 2003/0132881 A1 | 7/2003 | Shi |
| 2004/0029620 A1 | 2/2004 | Karaoguz ................... 455/574 |
| 2005/0063348 A1 | 3/2005 | Donovan .................... 370/338 |

OTHER PUBLICATIONS

IEEE P802.11a, Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band, 1999, 91 pages.

IEEE P802.11b, Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band, 1999, 96 pages.

IEEE P802.11 g/D8.2, Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band, Apr. 2003, 69 pages.

* cited by examiner

POWER SAVINGS APPARATUS AND METHOD FOR WIRELESS NETWORK DEVICES

CROSS-REFERENCE TO RELATED APPLICATIONS

This application is a continuation-in-part of U.S. patent application Ser. No. 10/650,887 filed on Aug. 28, 2003. The disclosure of the above application is incorporated herein by reference in its entirety.

FIELD OF THE INVENTION

The present invention relates to networks, and more particularly to reducing power consumption of wireless network devices.

BACKGROUND OF THE INVENTION

IEEE section 802.11, which is hereby incorporated by reference in its entirety, defines several different standards for configuring wireless Ethernet networks and devices. For example, 802.11 standards that have been popularized include 802.11(a), 802.11(b) and 802.11(g). Wireless Ethernet network devices may be implemented by a system on chip (SOC) circuit that includes a baseband processor (BBP), a medium access controller (MAC) device, a host interface, and one or more processors. The SOC circuit may include a radio frequency (RF) transceiver or the RF transceiver may be located externally. The host interface may include a peripheral component interface (PCI) although other types of interfaces may be used. The processor(s) may be advanced RISC machine (ARM) processor(s), although other types of processors may be used.

The MAC device controls and selects different operating modes of the BBP and the RF transceiver. During operation, the MAC device instructs the BBP and the RF transceiver to transition to a low power mode to conserve power. The BBP and RF transceivers may include phase-locked loops (PLL). The PLLs are calibrated using a reference signal that is supplied by a crystal oscillator (XOSC). The SOC may also include voltage regulators that provide regulated supply voltages to the system.

The network device is usually associated with a host system ("host"). In an infrastructure mode, the host communicates with a network via the Ethernet network device and an access point (AP). The MAC device typically instructs the BBP and the RF transceiver to transition to the low power mode when the AP and the host do not have data to exchange. However, the voltage regulator in the BBP remains active during the low power mode and still consumes a significant amount of power from digital switching as well as leakage current when advanced deep sub-micron technology is used. Additionally, the XOSC and PLL devices may remain active and also consume power during the low power mode.

In some conventional approaches, the operating voltage and/or the clock frequency are reduced during the low power mode while still allowing the system to operate at full capacity. However, many system components remain active during the low power mode and continue to consume power. In other conventional approaches, the way that functions are implemented is modified to reduce power consumption. For example, the device may lower a frequency of operation so that calculations take longer to complete. However, these system components still continue to consume power even when there are no computations to be performed.

SUMMARY OF THE INVENTION

A wireless network device having active and inactive modes comprises a clock generating module that generates a first clock signal having a first clock rate. A voltage supply module generates a first voltage level and a second voltage level that is less than the first voltage level. A first digital module receives the first clock rate and the first voltage level during the active mode, receives the second voltage level during the inactive mode and does not receive the first clock signal during the inactive mode. A first analog module communicates with the voltage supply module and has reduced current consumption during the inactive mode.

In other features, the voltage supply module generates a third voltage level and the first analog module receives the third voltage level during the active mode. The first analog module reduces the current consumption during the inactive mode in response to a control signal. The first analog module receives the first voltage level during both the active and inactive modes. The first analog module reduces the current consumption during the inactive mode in response to a control signal.

In yet other features, the clock generating module generates a second clock rate. The second clock rate is less than the first clock rate. The first digital module includes at least one of a modulator, a baseband processor, a demodulator, a medium access control (MAC) module, and a digital module in a clock data recovery (CDR) module. The first analog module includes at least one of an RF transceiver, a crystal oscillator, an analog to digital converter (ADC), a digital to analog converter (DAC), a current bias circuit, a voltage bias circuit, and an analog module in a clock data recovery (CDR) module.

In other features, a second digital module receives the second clock signal during the inactive mode. The second digital module receives the second clock signal during the active mode. The second digital module receives the second voltage level during the inactive mode. The second digital module includes a power management module that includes a counter. A second analog module receives the second voltage level during the active and inactive modes. The second analog module includes a low power oscillator.

In yet other features, a power on reset module prevents a logic reset of the first digital module due to operation at the second voltage level during the inactive mode. The clock generating module includes a crystal oscillator that generates a first reference frequency. The first clock rate is based on the first reference frequency. A low power oscillator generates a second reference frequency. The second clock rate is based on the second reference frequency.

A method for operating a wireless network device having active and inactive modes comprises generating a first clock signal having a first clock rate; generating a first voltage level and a second voltage level that is less than the first voltage level; receiving the first clock rate and the first voltage level at a first digital module of the wireless network device during the active mode; receiving the second voltage level during the inactive mode at the first digital module, which does not receive the first clock signal during the inactive mode; and reducing current consumption of a first analog module of the wireless network device during the inactive mode.

In other features, the method includes generating a third voltage level; and receiving the third voltage level the first analog module during the active mode. The method includes reducing the current consumption of the first analog module during the inactive mode in response to a control signal. The method includes receiving the first voltage level at the first analog module during both the active and inactive modes; and reducing the current consumption at the first analog module during the inactive mode in response to a control signal.

In still other features, the method includes generating a second clock rate. The second clock rate is less than the first clock rate. The first digital module includes at least one of a modulator, a baseband processor, a demodulator, a medium access control (MAC) module, and a digital module in a clock data recovery (CDR) module. The first analog module includes at least one of an RF transceiver, a crystal oscillator, an analog to digital converter (ADC), a digital to analog converter (DAC), a current bias circuit, a voltage bias circuit, and an analog module in a clock data recovery (CDR) module.

In other features, the method includes receiving the second clock signal at a second digital module during the inactive mode. The method includes receiving the second clock signal the second digital module during the active mode. The method includes receiving the second voltage level at the second digital module during the inactive mode. The method includes managing power at the second digital module. The method includes receiving the second voltage level at the second analog module during the active and inactive modes. The second analog module includes a low power oscillator. The method includes preventing a logic reset of the first digital module due to operation at the second voltage level during the inactive mode. The method includes generating a first reference frequency, wherein the first clock rate is based on the first reference frequency; and generating a second reference frequency, wherein the second clock rate is based on the second reference frequency.

A wireless network device having active and inactive modes comprises clock generating means for generating a first clock signal having a first clock rate. Voltage supply means generates a first voltage level and a second voltage level that is less than the first voltage level. First digital means receives the first clock rate and the first voltage level during the active mode, receives the second voltage level during the inactive mode and does not receive the first clock signal during the inactive mode. First analog means communicates with the voltage supply means and has reduced current consumption during the inactive mode.

In other features, the voltage supply means generates a third voltage level and the first analog means receives the third voltage level during the active mode. The first analog means reduces the current consumption during the inactive mode in response to a control signal. The first analog means receives the first voltage level during both the active and inactive modes. The first analog means reduces the current consumption during the inactive mode in response to a control signal. The clock generating means generates a second clock rate. The second clock rate is less than the first clock rate.

In other features, the first digital means includes at least one of a modulator, a baseband processor, a demodulator, a medium access control (MAC) module, and a digital module in a clock data recovery (CDR) means. The first analog means includes at least one of an RF transceiver, a crystal oscillator, an analog to digital converter (ADC), a digital to analog converter (DAC), a current bias circuit, a voltage bias circuit, and an analog means in a clock data recovery (CDR) means. Second digital means receives the second clock signal during the inactive mode.

In other features, the second digital means receives the second clock signal during the active mode. The second digital means receives the second voltage level during the inactive mode. The second digital means includes power management means for managing power and that includes a counter. Second analog means receives the second voltage level during the active and inactive modes. The second analog means includes a low power oscillator. Power on reset means prevents a logic reset of the first digital means due to operation at the second voltage. The clock generating means includes crystal oscillating means for generating a first reference frequency, wherein the first clock rate is based on the first reference frequency, and low power oscillating means for generating a second reference frequency, wherein the second clock rate is based on the second reference frequency.

A power on reset (POR) circuit for a wireless network device having active and inactive modes comprises a first power detection module that compares a first voltage level to a first threshold and that changes state when the first voltage level exceeds the first threshold. A second power detection module compares a second voltage level to a second threshold and changes state when the second voltage level exceeds the second threshold. A POR enable module communicates with the first and second power detection modules, selectively generates a POR enable signal during an initial power on reset and thereafter disables the POR enable signal.

In other features, the POR enable module disables the POR enable signal after receiving a sequence of M sets of N predetermined data bits. The POR enable module disables the POR enable signal when the sequence of M sets of N predetermined data bits are synchronized with clock signals. A system comprises the POR circuit and further comprises a wireless network device having active and inactive modes.

In other features, the digital portions of the wireless network device operate at a first voltage during the active mode and a second voltage level during the inactive mode. The first voltage level is greater than the second voltage level. The clock signals are successive clock signals.

A method of operating a power on reset (POR) circuit for a wireless network device having active and inactive modes comprises comparing a first voltage level to a first threshold; changing state when the first voltage level exceeds the first threshold; comparing a second voltage level to a second threshold; changing state when the second voltage level exceeds the second threshold; selectively generating a POR enable signal during an initial power on reset and disabling the POR enable signal thereafter.

In other features, the method includes disabling the POR enable signal after receiving M sets of N predetermined data bits. The method includes disabling the POR enable signal when the predetermined sequence of N data bits are synchronized with clock signals. A wireless network device communicates with the POR circuit and has active and inactive modes. The method includes operating digital portions of the wireless network device at a first voltage level during the active mode and a second voltage level during the inactive mode. The first voltage level is greater than the second voltage level. The clock signals are successive clock signals.

A power on reset (POR) circuit for a wireless network device having active and inactive modes comprises first power detection means for comparing a first voltage level to a first threshold and for changing state when the first voltage level exceeds the first threshold. Second power detection means compares a second voltage level to a second threshold and changes state when the second voltage level exceeds the second threshold. POR enable means communicates with the first and second power detection means, selectively generates a POR enable signal during an initial power on reset and disables the POR enable signal thereafter.

In other features, the POR enable means disables the POR enable signal after receiving M sets of N predetermined data bits. The POR enable means disables the POR enable signal when the sequence of M sets of N predetermined data bits are synchronized with clock signals. A system comprises the POR circuit and further comprises wireless network means for communicating with the POR circuit and having active and inactive modes. The digital portions of the wireless network device operate at a first voltage during the active mode and a second voltage level during the inactive mode. The first voltage level is greater than the second voltage level. The clock signals are successive clock signals.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
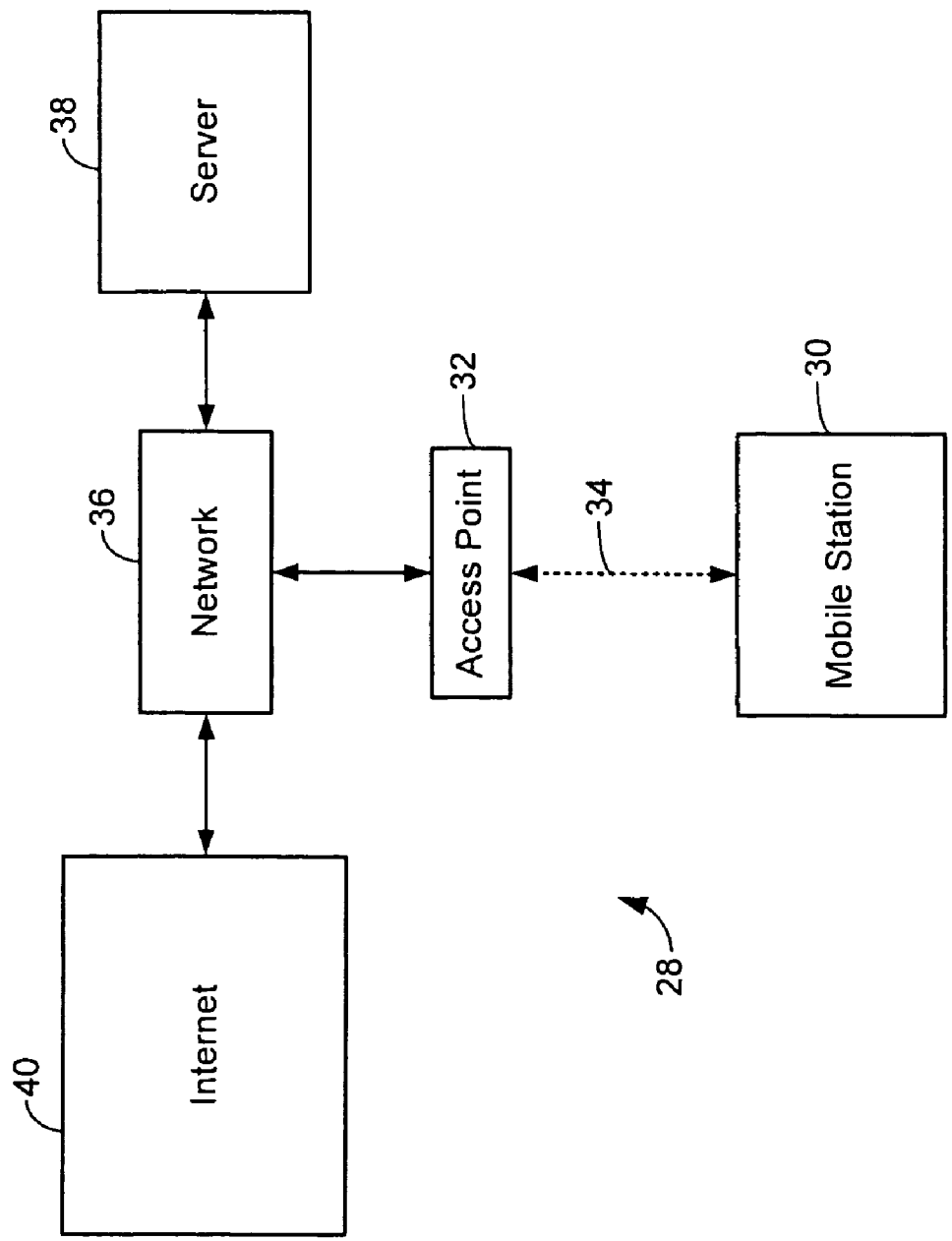
FIG. 1 illustrates a wireless network that is configured in an infrastructure mode and that includes a mobile station and an access point according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term device refers to an application specific integrated circuit (ASIC), an electronic circuit, a processor (shared, dedicated, or group) and memory that execute one or more software or firmware programs, a combinational logic circuit, or other suitable components that provide the described functionality.

Referring to FIG. 1, a first wireless network 28 is illustrated in an infrastructure mode as defined by IEEE 802.11 and other future wireless standards. The first wireless network 28 includes one or more mobile stations 30 and one or more access points (AP) 32. The mobile station 30 and the AP 32 transmit and receive wireless signals 34. The AP 32 is a node in a network 36. The network 36 may be a local area network (LAN), a wide area network (WAN), or another network configuration. The network 36 may include other nodes such as a server 38 and may be connected to a distributed communications system 40 such as the Internet.

The mobile station 30 does not continuously transmit data to or receive data from the AP 32. Therefore, the mobile station 30 implements a power savings mode when the mobile station 30 and the AP 32 do not have data to exchange. Data commonly remains intact in a network for a predetermined amount of time before it is dropped. IEEE section 802.11 provides the opportunity for the mobile station 30 to inform the AP 32 when the mobile station 30 is entering a low power mode (and will not be capable of receiving data for a predetermined period of time). After notifying the AP, the mobile station transitions to the low power mode. During the low power period, the AP 32 buffers data that is intended to be transmitted to the mobile station 30. Following the low power period, the mobile station 30 powers up and receives beacon transmissions from the AP 32. If the beacon transmissions indicate that the AP 32 has data for the mobile station 30, or the host processor of mobile station 30 indicates it has data to transmit, the mobile station 30 remains active. Otherwise, the mobile station 30 enters the low power mode again.

Figure 2:
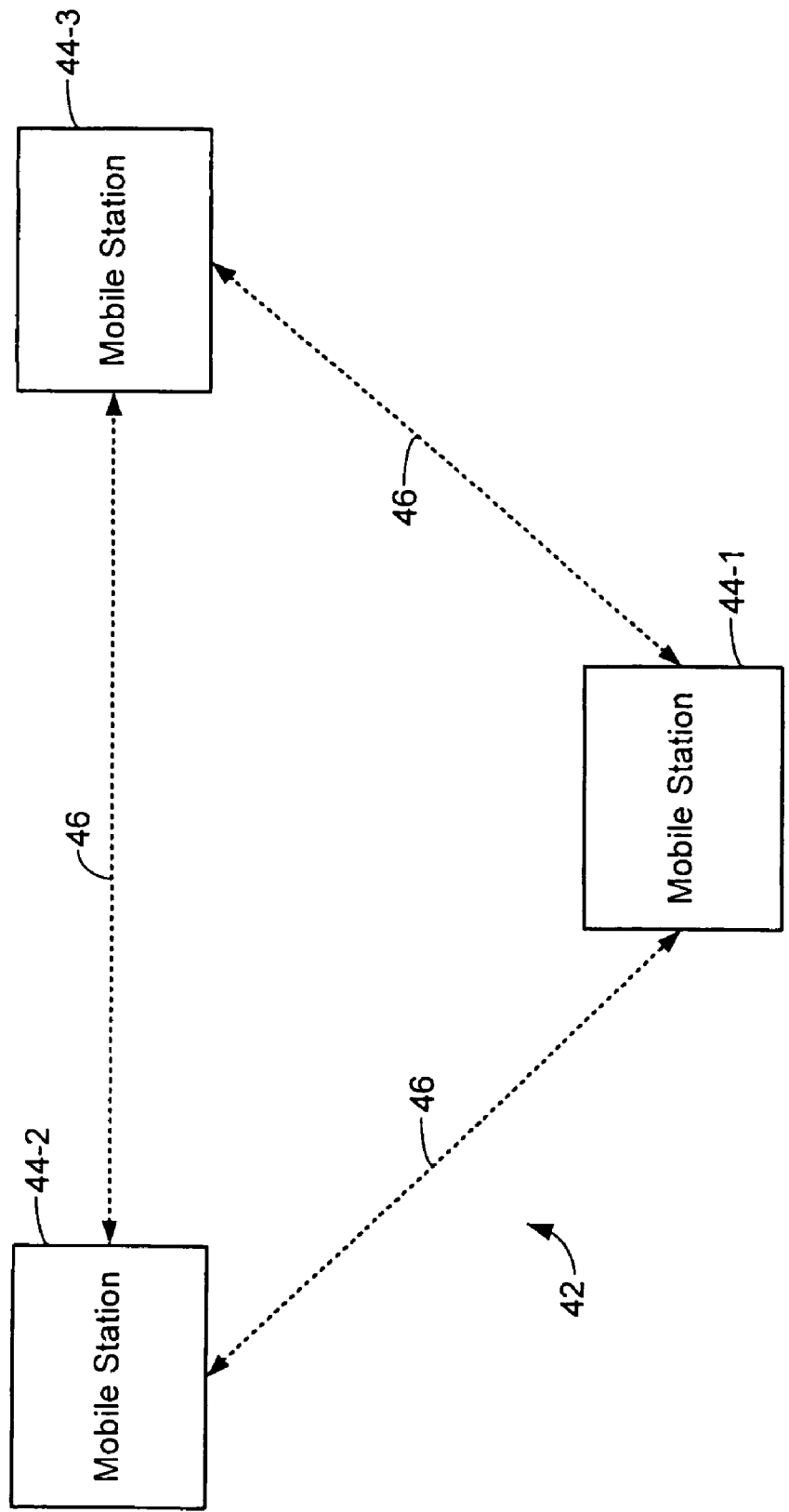
FIG. 2 illustrates a wireless network that is configured in an ad-hoc mode and that includes multiple mobile stations according to the prior art.

Referring now to FIG. 2, a second wireless network 42 operates in an ad-hoc mode as defined by IEEE section 802.11 and other future wireless standards. The second wireless network 42 includes multiple mobile stations 44-1, 44-2, and 44-3 that transmit and receive wireless signals 46. The mobile stations 44-1, 44-2, and 44-3 collectively form a LAN and communicate directly with each other. The mobile stations 44-1, 44-2, and 44-3 are not necessarily connected to another network. The mobile stations 44-1, 44-2, and 44-3 do not continuously transmit data to and receive data from each other. The mobile stations 44 implement a power savings mode when one of the mobile stations 44-1 does not have data to exchange with the other mobile stations 44-2 and 44-3.

IEEE section 802.11 does not require the mobile stations 44-1, 44-2, and 44-3 to buffer data as performed in the AP. The mobile station 44-1 informs the other mobile stations 44-2 and 44-3 that the mobile station 44-1 is entering the low power mode for the low power period. According to the present invention, the other mobile stations 44-2 and 44-3 preferably extend the life of data intended for the mobile station 44-1 for the predetermined period. Alternately, the other mobile stations retransmit data until the low power period expires. Following the low power period, the mobile station 44-1 detects whether the other mobile stations 44-2 and 44-3 have data for the mobile station 44-1 (to determine whether or not to execute the low power mode again).

Figure 3:
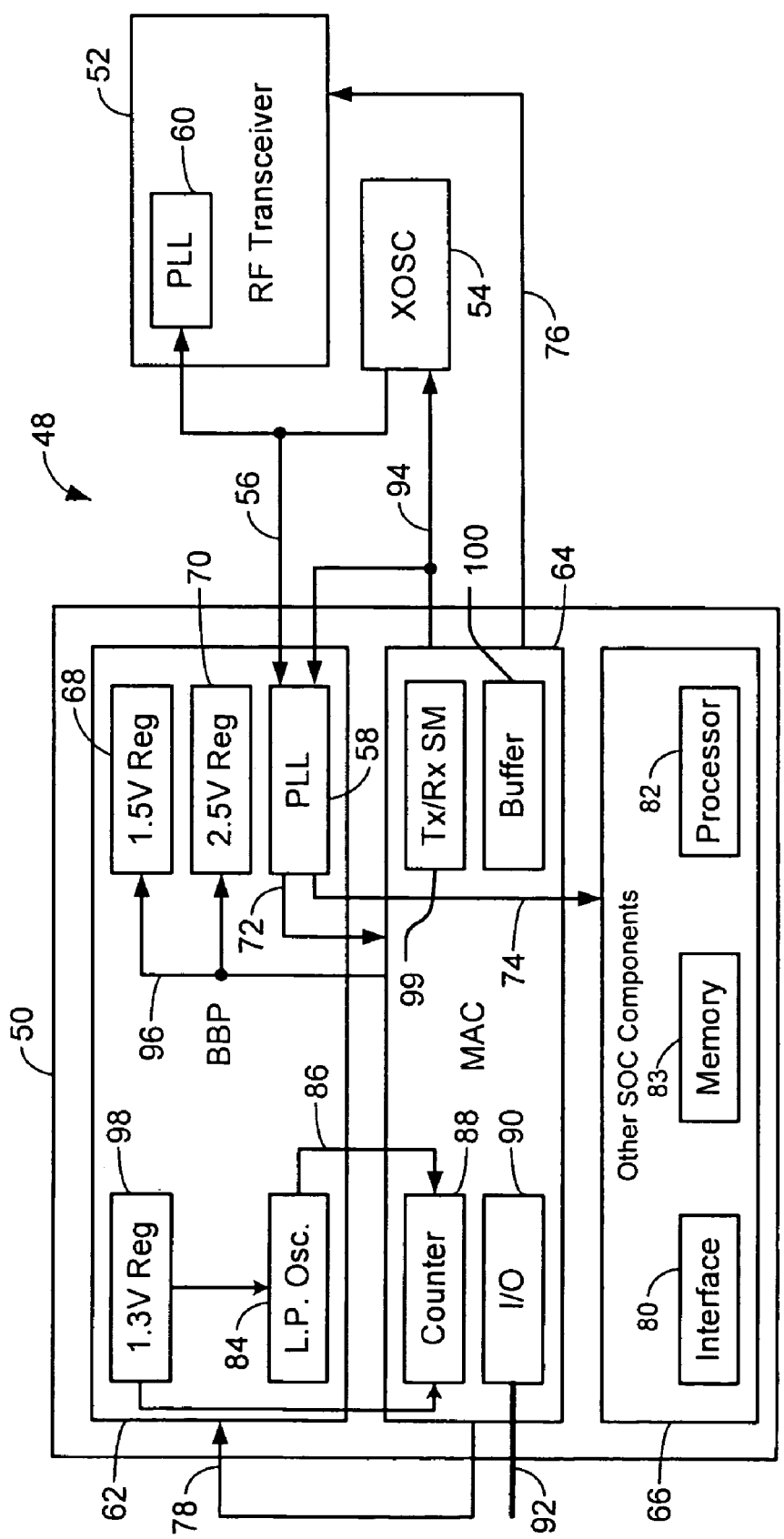
FIG. 3 is a functional block diagram of a wireless network communications device that implements a power savings mode according to the present invention.

Referring now to FIG. 3, a wireless network communications device 48 in a mobile station operates in two power modes. In an active mode, the wireless network communications device 48 processes incoming and outgoing data. In the low power mode, the wireless network communications device 48 does not transmit or receive data. In one implementation, the wireless network communications device 48 includes an SOC circuit 50, an external radio frequency (RF) transceiver 52, and a crystal oscillator (XOSC) 54. The crystal oscillator 54 can be located externally or the amplifier portion of the crystal oscillator 54 can be integrated with the SOC circuit 50 or the RF transceiver 52, and the crystal portion of the crystal oscillator 54 can be located externally.

The RF transceiver 52 wirelessly transmits/receives data to/from an AP or another mobile station. The XOSC 54 provides a reference signal 56 to first and second phase-locked loops (PLL) 58 and 60. The first PLL 58 is located in the SOC circuit 50 and the second PLL 60 is located in the RF transceiver 52. The first and second PLL 58 and 60 generate clock signals that are based on the reference signal 56 from the XOSC 54. For example, the XOSC 54 may provide a reference signal at a frequency of 44 MHz, although other frequencies may be used.

In one implementation, the SOC circuit 50 includes a baseband processor (BBP) 62, a medium access control (MAC) device 64, and other SOC components 66. The BBP 62 includes a digital voltage regulator 68, an analog voltage regulator 70, and the first PLL 58. The digital and analog voltage regulators 68 and 70, respectively, supply regulated voltages to one or more components in the SOC circuit 50. For example, the digital voltage regulator 68 may operate at 1.5V and the analog voltage regulator 70 may operate at 2.5V. Those skilled in the art can appreciate that additional analog and/or digital voltage regulators and/or voltage regulators operating at other voltages may be employed. The first PLL 58 generates one or more clock signals 72 for the MAC device 64, one or more clock signals 74 for the other SOC components 66 and one or more clock signals for the BBP 62 based on the reference signal 56 from the XOSC 54.

The MAC device 64 transmits a transceiver mode signal 76 to the RF transceiver 52. The transceiver mode signal 76 instructs the RF transceiver 52 to operate in the active mode or the low power mode. The RF transceiver 52 transmits and receives RF signals during the active mode. The RF transceiver remains deactivated during the low power mode and does not transmit or receive RF signals. Preferably, the RF transceiver 52 is completely shut down for maximum power reduction. However, during the low power mode, the RF transceiver 52 may utilize a small amount of power to ensure a quick transition from the low power mode to the active mode.

The MAC device 64 also transmits a BBP mode signal 78 to the BBP 62. The BBP mode signal 78 instructs the BBP 62 to operate in the active mode or the low power mode. The other SOC components 66 include a host interface 80, a processor 82 and memory 83. The host interface 80 provides an interface such as peripheral component interconnect (PCI) interface or other suitable interfaces. The host interface may be connected to a host. The processor 82 may be an advanced RISC machine (ARM) processor and/or any other processor. The memory 83 stores data.

The MAC device 64 executes the low power mode when the wireless network communications device 48 and either an AP or another mobile station do not have data to exchange. Before executing the low power mode, the MAC device 64 also preferably ensures that the transmit buffer is empty, that the transmit and receive state machines are idle and that the wireless network communications device 48 is not currently in the process of receiving or transmitting data. The duration that the wireless network communications device 48 operates in the low power mode varies. The start time is variable and the end time is fixed (in other words, the low power mode ends before the start of a beacon). If the wireless network communications device 48 is not triggered during the low power mode, it returns to the active mode before the start of a beacon. The XOSC 54 consumes a significant amount of power during the active mode. For example, the XOSC 54 may consume 10-12 mA of current. Therefore, the MAC device 64 deactivates the XOSC 54 during the low power mode.

The BBP 62 includes a low power oscillator 84 that provides a signal 86 to a counter 88 in the MAC device 64. For example, the low power oscillator 84 may be implemented either internally (as shown) or externally and may operate at a frequency of 100 kHz. The counter 88 determines the amount of time that the wireless network communications device 48 operates in the low power mode. The low power oscillator 84 is typically susceptible to performance deviations due to temperature variances. Therefore, before the wireless network communications device 48 enters the low power mode, the processor 82 may calibrate the low power oscillator 84 using the XOSC 54 to ensure that the low power oscillator 84 accurately tracks the desired low power time period. The calibration may be performed every time that the low power mode occurs, periodically, randomly, on an event basis or using any other criteria.

For example, the processor 82 may measure the difference between the frequency of the low power oscillator 84 and the frequency of the XOSC 54. Based on the frequency difference, the processor 82 determines the number of times that the counter 88 must increment or decrement to equal a desired period. The XOSC 54 can also calibrate the low power oscillator 84 on a periodic basis.

The MAC device 64 includes an input/output (I/O) module 90, which may be located outside of the MAC in the SOC circuit 50. For example, the I/O module 90 may be a general purpose I/O module (GPIO). In the event that a mobile station requires the wireless network communications device 48 to return to the active mode, the mobile station triggers an I/O input 92. If the I/O input 92 is triggered during the low power mode, the wireless network communications device 48 returns to the active mode. Some host interfaces such as a compact flash card may not include a signal to trigger the I/O module. In that case, the processor 82 generates an interrupt when the wireless network communications device 48 returns to the active mode. The interrupt queries the host to determine whether the host has data to transmit.

The MAC device 64 executes the low power mode in an infrastructure network by first transmitting the low power period to the AP. In an ad-hoc network, the transmit beacon period is assumed. The low power period may specify a listen interval. The listen interval is equal to a full cycle of operation of the wireless network communications device 48 in the active and low power modes, as will be described in further detail below. Next, the processor 82 optionally calibrates the low power oscillator 84 using signals generated by the XOSC 54. The MAC device 64 instructs the BBP 62 and the RF transceiver 52 to enter the low power mode. The MAC device 64 disables internal clocks in the SOC circuit 50 and then the PLL 58. The MAC device 64 disables the XOSC 54 and the voltage regulators 68 and 70 with a disable signal 94.

Since the MAC device 64 disables the digital voltage regulator 68 during the low power mode, the BBP 62 includes a low power digital voltage regulator 98. The low power voltage regulator 98 dissipates less power than the other voltage regulators. For example, the voltage regulator 98 may operate at 1.3 V and with a lower current level than the other regulators. The low power voltage regulator 98 provides power for the low power oscillator 84 and the counter during the low power mode. The low power voltage regulator 98 also supplies power to registers and memories in the SOC circuit 50 so that the state of the SOC circuits 50 is retained, which is important for fast wake up time. The MAC device also includes transmit and receive state machines 99 and a transmit buffer 100.

During the low power mode, the I/O module 90 monitors the I/O input 92. If the I/O input 92 is not triggered during the low power mode, the wireless network communications device 48 returns to the high power mode after the counter 88 reaches the end of the low power period. In order to return to the active mode, the MAC device 64 enables the voltage regulators 68 and 70 and the XOSC 54, respectively. The MAC device 64 activates the first PLL 58. The MAC device next enables the internal clocks 72 and 74. Finally, the MAC device 64 instructs the BBP 62 and the RF transceiver 52 to operate in the active mode.

In the infrastructure network, the AP periodically broadcasts beacon transmissions. The beacon transmissions include a traffic map that indicates whether the AP has buffered data that requires transmission to a mobile station. When the wireless network communications device 48 returns to the active mode, the processor 82 examines the traffic map in one of the beacon transmissions. The examination of the traffic map could also be performed by dedicated hardware. If the traffic map indicates that an AP does not have data to transmit to the wireless network communications device 48, the MAC device 64 executes the low power mode again. The processor also optionally checks with the host system to see if the host has any data to transmit.

In the ad hoc mode, there is an Announcement Traffic Indication Message (ATIM) period during which mobile stations send directed ATIM messages. The mobile station wakes up prior to the ATIM period. If an ATIM message is directed to the mobile station during the ATIM period, the mobile station remains in the active mode. Otherwise the mobile station transitions back to the low power mode.

Figure 4:
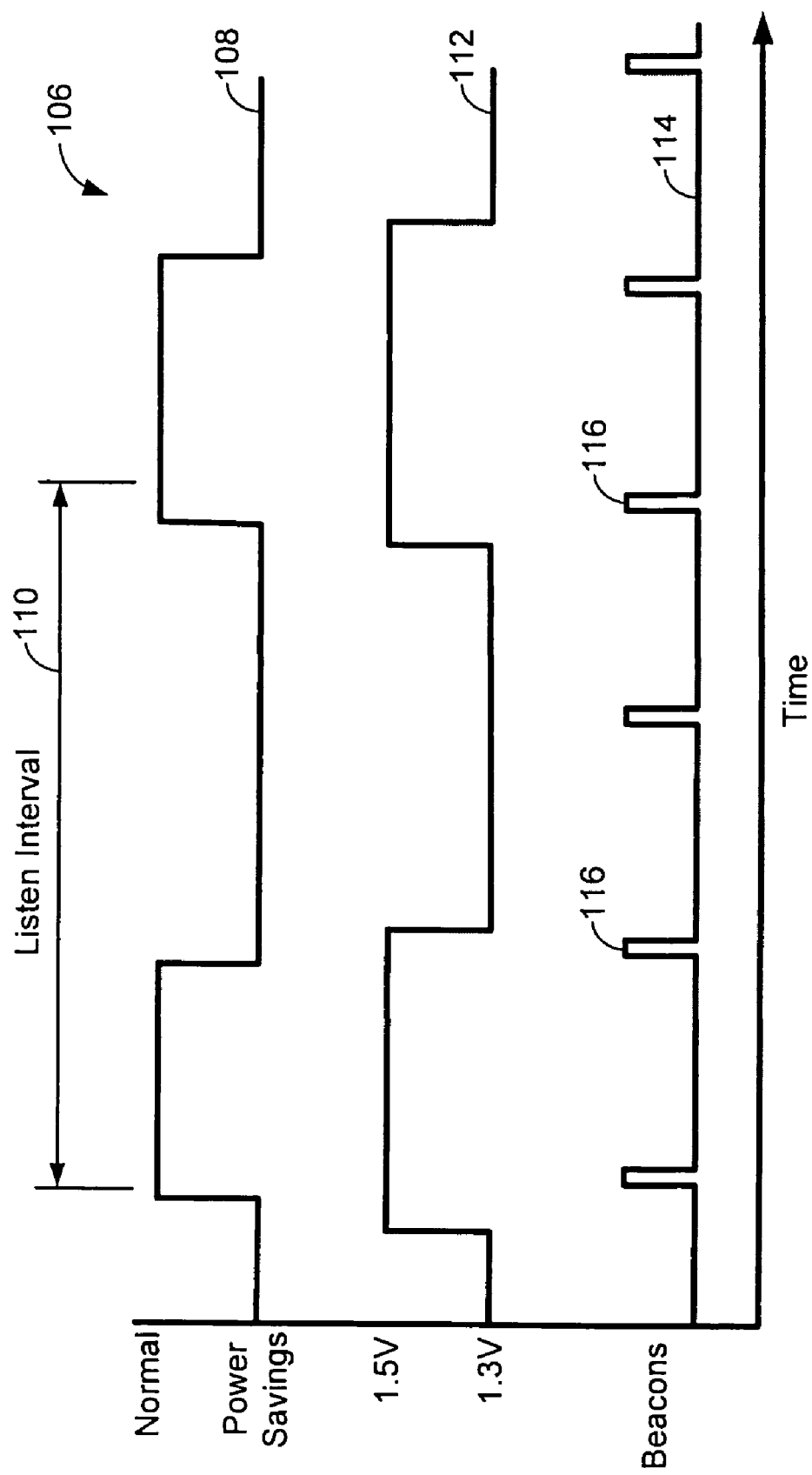
FIG. 4 is a timing diagram that illustrates operating modes and supply voltage levels.

Referring now to FIG. 4, an exemplary timing diagram 106 according to the present invention is illustrated. A chipset mode signal 108 identifies the active mode and the low power mode. A listen interval 110 is equal to a full cycle (high and low power modes) of the wireless network communications device 48. A supply voltage signal 112 indicates the voltage level that is supplied by either the digital voltage regulator 68 or the low power digital voltage regulator 98. The supply voltage signal 112 illustrates the supply voltage fluctuation between 1.3 V to 1.5 V prior to the wireless network communications device 48 returning to the normal mode. As can be appreciated, other higher and/or lower voltage levels may be used (such as but not limited to 1.1V and 1.3 V). This ensures that the digital voltage regulator 68 supplies a sufficient amount of power to devices such as the BBP 62 when the devices return from the low power mode. Additionally, the supply voltage decreases from 1.5 V to 1.3 V shortly after the wireless network communications device 48 enters the low power mode. This ensures that the SOC circuit 50 receives sufficient power and avoids overloading before devices such as the BBP 62 are completely deactivated.

A beacon transmission signal 114 illustrates an exemplary beacon transmission pattern from the AP. The listen interval 110 is typically measured by the number of beacons 116. The wireless network communications device 48 informs the AP that the wireless network communications device 48 will be in the low power mode for a predetermined number of beacons 116. For example, beacon transmissions may take place every 100 ms. Therefore, the listen interval 110 will typically range from 100 ms to a few seconds. Preferably, the wireless network communications device 48 returns to the active mode just prior to a beacon transmission. Therefore, the wireless network communications device 48 does not have to operate in the active mode for a long time while an AP has no data to transmit. For example, the wireless network communications device 48 may operate in the active mode for less than 10 ms, or approximately 1% to 10% of the listen interval 110 when the AP does not have data to transmit.

The wireless network communications device 48 preferably transmits the listen interval period to the AP when the wireless network communications device 48 initially associates with the AP rather than each time that the wireless network communications device 48 enters the low power mode.

Figure 5:
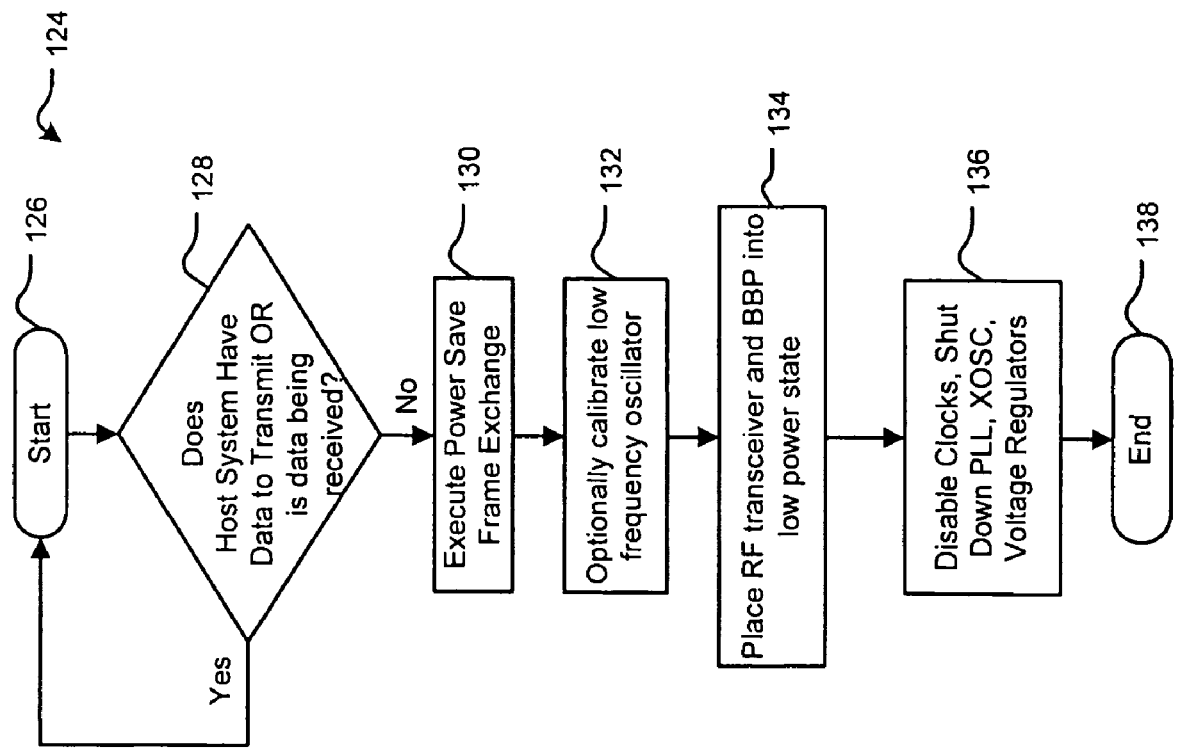
FIG. 5 is a flowchart illustrating steps performed by the wireless network communications device to enter the power savings mode when configured in the infrastructure mode.

Referring now to FIG. 5, an infrastructure mode shutdown algorithm 124 begins in step 126. In step 128, the wireless network communications device determines whether the host system has data to transmit or whether data is being received. If true, control returns to step 126. If false, control proceeds to step 130. In step 130, the wireless network communications device 48 executes a power save frame exchange, which indicates that the wireless network communications device is entering a low power mode. In step 132, the processor 82 optionally calibrates the low power oscillator 84 using signals generated by the XOSC 54. Steps 130 and 132 can be executed in the opposite order, or in parallel. In step 134, the BBP and the RF transceiver are transitioned to the low power mode or state. In step 136, the internal clocks are disabled and the PLLs, the XOSC and the voltage regulators are shut down. Control ends in step 138.

Figure 6:
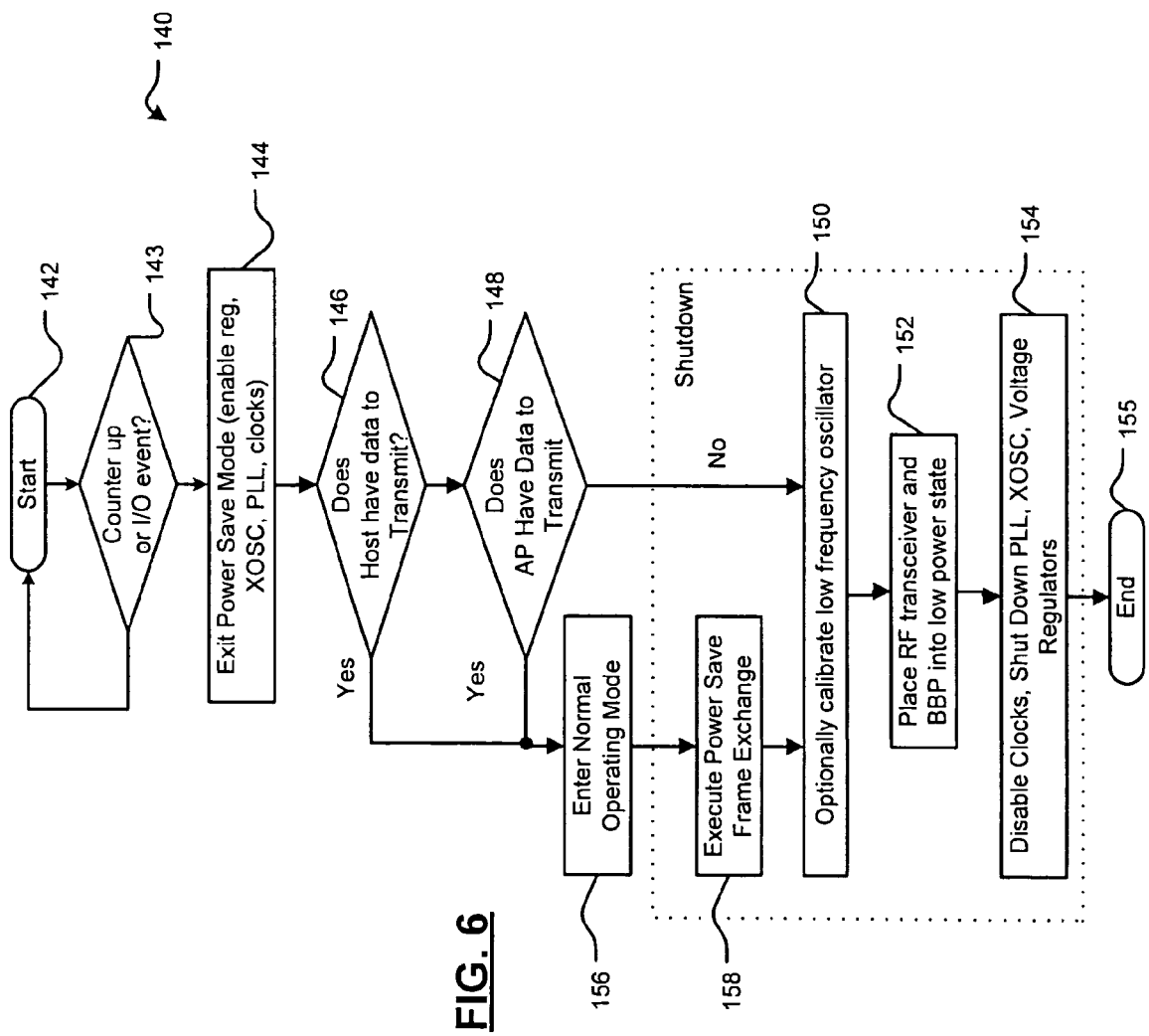
FIG. 6 is a flowchart illustrating steps performed by the wireless network communications device to exit the power savings mode when configured in the infrastructure mode.

Referring now to FIG. 6, an infrastructure mode low power algorithm 140 begins in step 142. In step 143, control determines whether the counter is up or an I/O event occurs. If true, control continues with step 144 where the wireless network communications device exits the power saving mode by enabling voltage regulators, the XOSC, the PLLs and the internal clocks. In step 146, the wireless network communications device determines whether the host system has data to transmit. If not, the wireless network communications device determines whether the access point has data to transmit in step 148. If not, the low frequency oscillator is optionally calibrated in step 150. In step 152, the RF transceiver and the BBP are transitioned to the low power mode or state. In step 154, the internal clocks are disabled and the PLLs, the XOSC and the voltage regulators are shut down. In step 155, control ends.

If either step 146 or 148 are true, the wireless network communications device enters the normal operating mode in step 156. The wireless network communications device executes power save frame exchange in step 158 and then continues with step 150, as described above.

Figure 7:
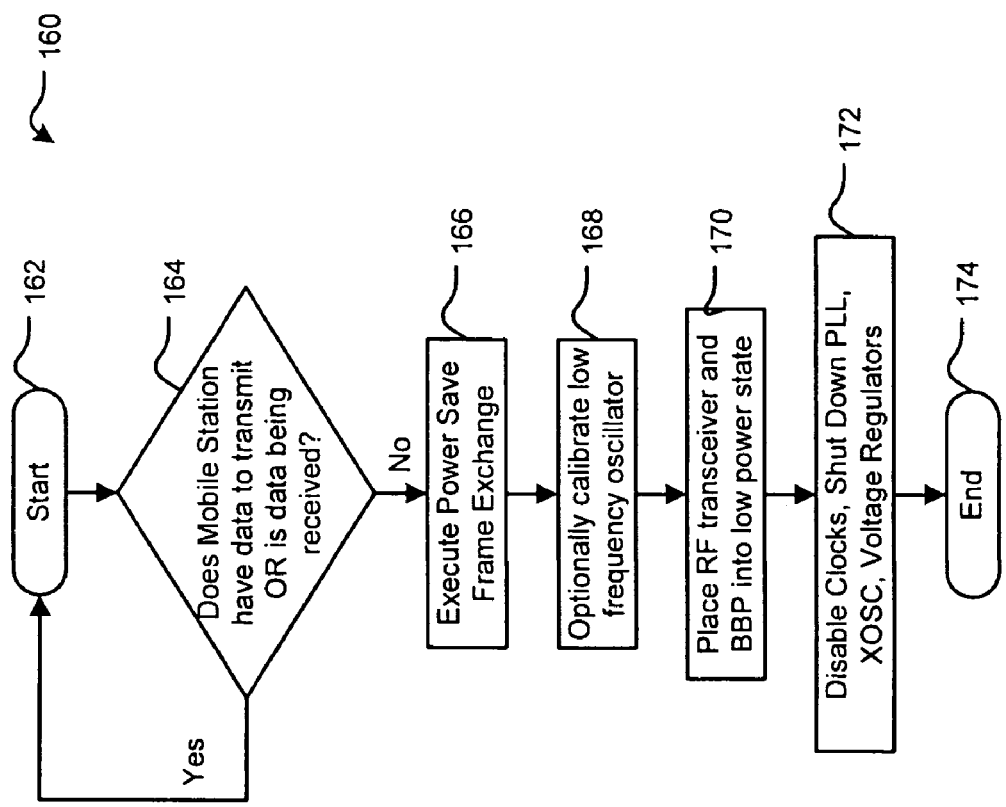
FIG. 7 is a flowchart illustrating steps performed by the wireless network communications device to enter the power savings mode when configured in the ad-hoc mode.

Referring now to FIG. 7, an ad-hoc mode shutdown algorithm 160 begins in step 162. In step 164, control determines whether the mobile station has data to transmit or whether data is being received. If true, control returns to step 162. If false, control proceeds to step 166. In step 166, the wireless network communications device 48 executes a power save frame exchange. In step 168, the processor 82 optionally calibrates the low power oscillator 84 using signals generated by the XOSC 54. In step 134, the RF transceiver and the BBP are transitioned to the low power state or mode. In step 172, the internal clocks are disabled and the PLLs, the XOSC and the voltage regulators are shut down. Control ends in step 174.

Figure 8:
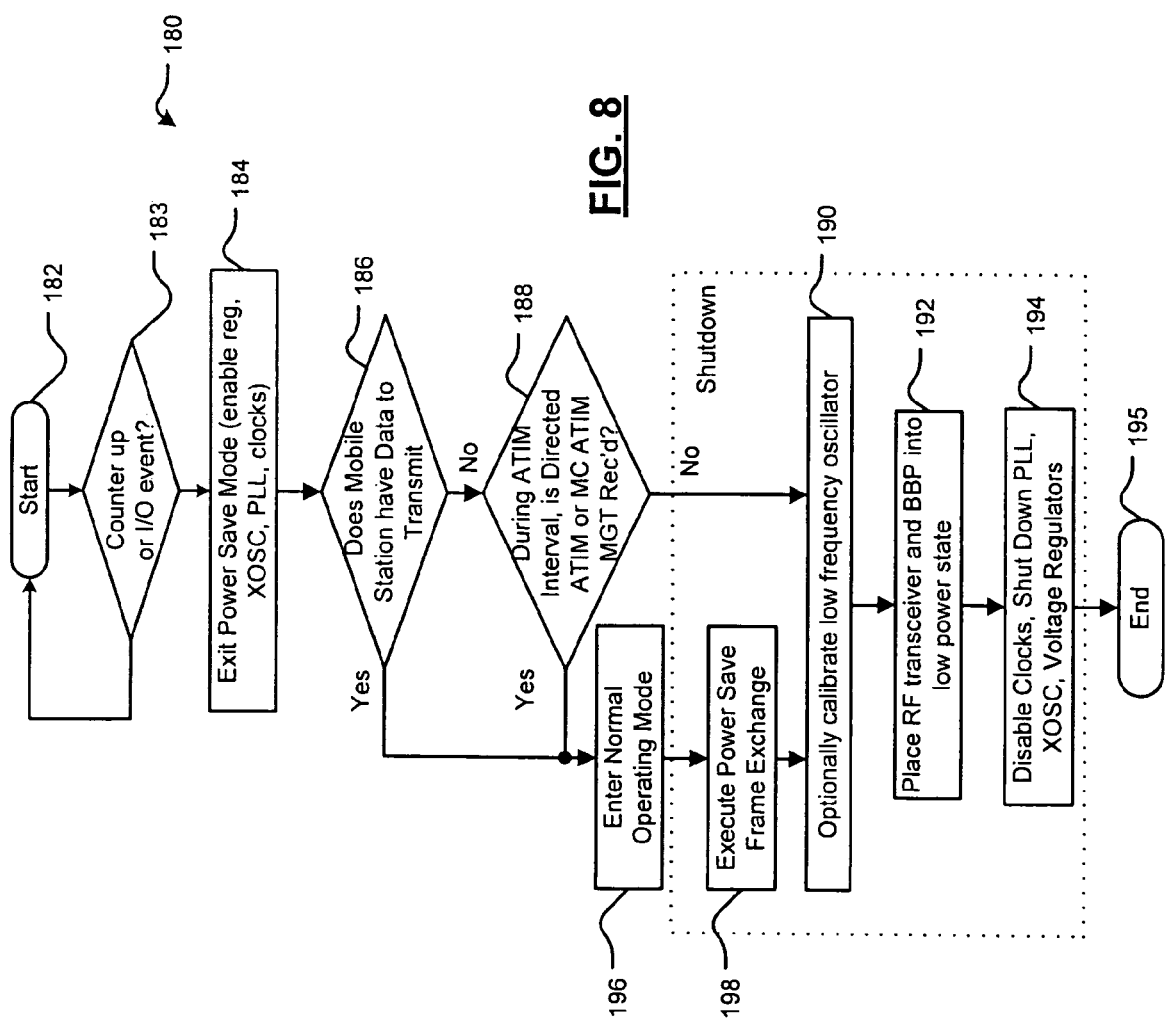
FIG. 8 is a flowchart illustrating steps performed by the wireless network communications device to exit the power savings mode when configured in the ad-hoc mode.

Referring now to FIG. 8, an ad-hoc mode low power algorithm 180 begins in step 182. In step 183, control determines whether the counter is up or an I/O event occurs. If true, control continues with step 184 where the wireless network communications device exits the power saving mode by enabling the voltage regulators, the XOSC, the PLLs and the internal clocks. In step 186, the wireless network communications device determines whether the mobile station has data to transmit. If not, the wireless network communications device determines whether a directed Announcement Traffic Indication Message (ATIM) or multicast (MC) ATIM management signal is received during the ATIM period in step 188. If not, the low frequency oscillator is calibrated in step 190. In step 192, the PHY (the RF transceiver and the BBP) are transitioned to the low power mode. In step 194, the clocks are disabled and the PLL, XOSC and voltage regulators are shut down. In step 195, control ends.

If either step 186 or 188 are true, the wireless network communications device enters the normal operating mode in step 196. The wireless network communications device executes a power save frame exchange in step 198 and then continues with step 190, as described above.

The low power mode according to the present invention reduces power consumption in communications devices. In one implementation, power consumption was approximately 325 mA during the transmit mode and 180 mA during the receive mode. Current consumption was less than approximately 300 μA and power consumption was less than 1 mW during the low power mode.

As can be appreciated, the relative locations of the PLLs, the voltage regulators, the counter, the oscillators and other components of the wireless network communications device can be altered from that shown in the FIGs. without departing from the spirit of the invention. In addition, while the wireless communications device was implemented using an SOC circuit, skilled artisans will appreciate that the wireless communications device can be implemented in any suitable manner. While the present invention was described in conjunction with IEEE section 802.11, the present invention applies to any wireless network device. The low power oscillator can be operated during the active mode so that the calibration can be performed. Likewise, the lower power voltage regulator can also be powered during the active mode if desired.

Figure 9A:
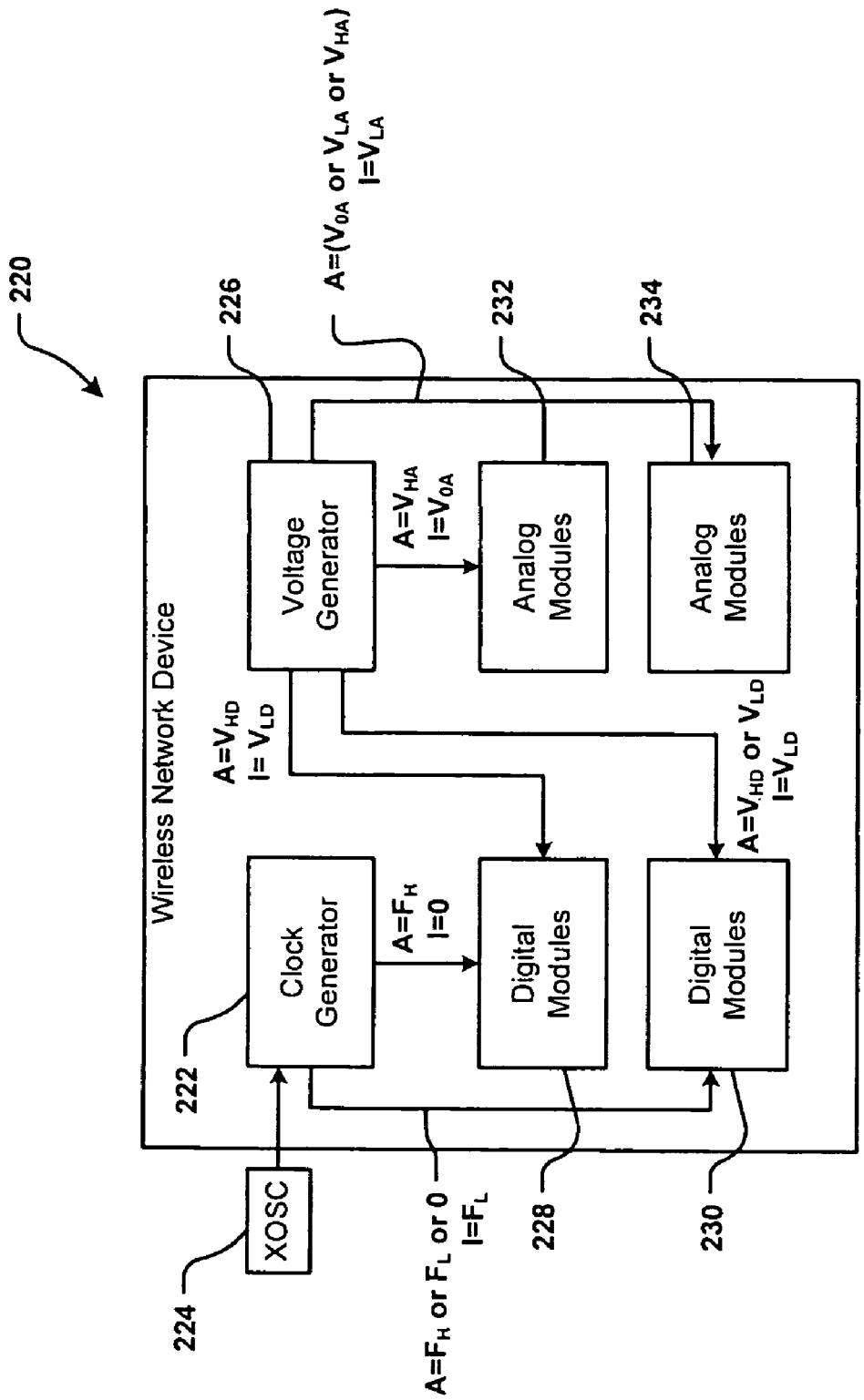
FIGS. 9A and 9B show various wireless network devices having active and inactive modes according to some implementations of the present invention.

Referring now to FIG. 9A, a wireless network device 220 is shown to include a clock generator module 222, which receives a reference frequency from a crystal oscillator (XOSC) 224. The clock generator 222 generates two or more clock signals including a first clock signal having a clock rate $F_H$ that is higher than a clock rate $F_L$ of a second clock rate. While a single clock generator is shown, skilled artisans will appreciate that the clock generator 222 can be implemented in a variety of ways. For example, the clock generator 222 may include a low power oscillator that generates the second clock signal $F_L$.

The wireless network device 220 includes a voltage generator module 226 that generates two or more voltage levels including a first voltage level (a high digital voltage $V_{HD}$) that is higher than a second voltage level (a low digital voltage $V_{LD}$). The voltage generator module 226 may also generate a high analog voltage $V_{HA}$ that is equal to $V_{HD}$ or to another value. The voltage generator module 226 may also generate a low analog voltage $V_{LA}$ that is equal to $V_{LD}$ or to another value.

The wireless network device 220 includes one or more first digital modules 228 and one or more second digital modules 230. The wireless network device 220 further includes one or more first analog modules 232 and one or more second analog modules 234. As can be appreciated by skilled artisans, functional interconnections between the digital and analog modules are not shown in FIGS. 9A and 9B. In addition, some components of the wireless network device may include both analog and digital modules.

The first digital modules 228 receive the first voltage level $V_{HD}$ and the first clock signal $F_H$ during the active mode. The first digital modules 228 receive the second voltage level $V_{LD}$ and do not receive a clock signal during the inactive mode, which reduces digital switching losses. In addition, since the first digital modules 228 receive the second voltage level $V_{LD}$ during the inactive mode, they can maintain their logic state until the next active mode. In some implementations, $V_{LD}$ is set substantially equal to a minimum voltage that will maintain the logic state to minimize power loss and/or within a predetermined threshold thereof. Exemplary first digital modules 228 include modulators, demodulators, and external interfaces in the BBP, the MAC, digital modules in clock data recovery (CDR) circuits, and/or other digital modules that operate during the active mode.

The second digital modules 230 receive $V_{LD}$ and the second clock signal $F_L$ during the inactive mode. The second digital modules 230 receive the first and/or the second voltage level $V_{HD}$ or $V_{LD}$, respectively, or no voltage during the active mode. The second digital modules 230 receive $F_H$, $F_L$ and/or no clock signal during the active mode. In other words, some of the second digital modules 230 may not be powered or clocked during the active mode. Exemplary second digital modules 230 include counters for timing the inactive mode, a power management module that manages transitions between the active and inactive modes, and/or other digital modules that need to operate during the inactive mode.

The first analog modules 232 receive the first voltage level $V_{HA}$ during the active mode and no voltage $V_{0A}$ (zero volts, a relatively low voltage substantially equal to zero, and/or the lowest reference potential) during the inactive mode. Since the first analog modules 232 receive a decreased voltage or no voltage during the inactive mode, power dissipation is reduced. Exemplary first analog modules 232 include phase lock loops, XOSC, VCO, LNA, PA, ADC, DAC, current bias circuits, voltage bias circuits, analog blocks within the clock data recovery module, and/or other analog circuits that need to operate during the active mode.

The second analog modules 234 receive the low voltage $V_{LA}$ during the inactive mode. In some implementations, $V_{LD}$ is equal to $V_{LA}$. The second analog modules 234 may receive 0, $V_{LA}$ and/or $V_{HA}$ during the active mode. Exemplary second analog modules 234 include a low power oscillator and other types of low power analog circuits that need to operate during the inactive mode.

Figure 9B:
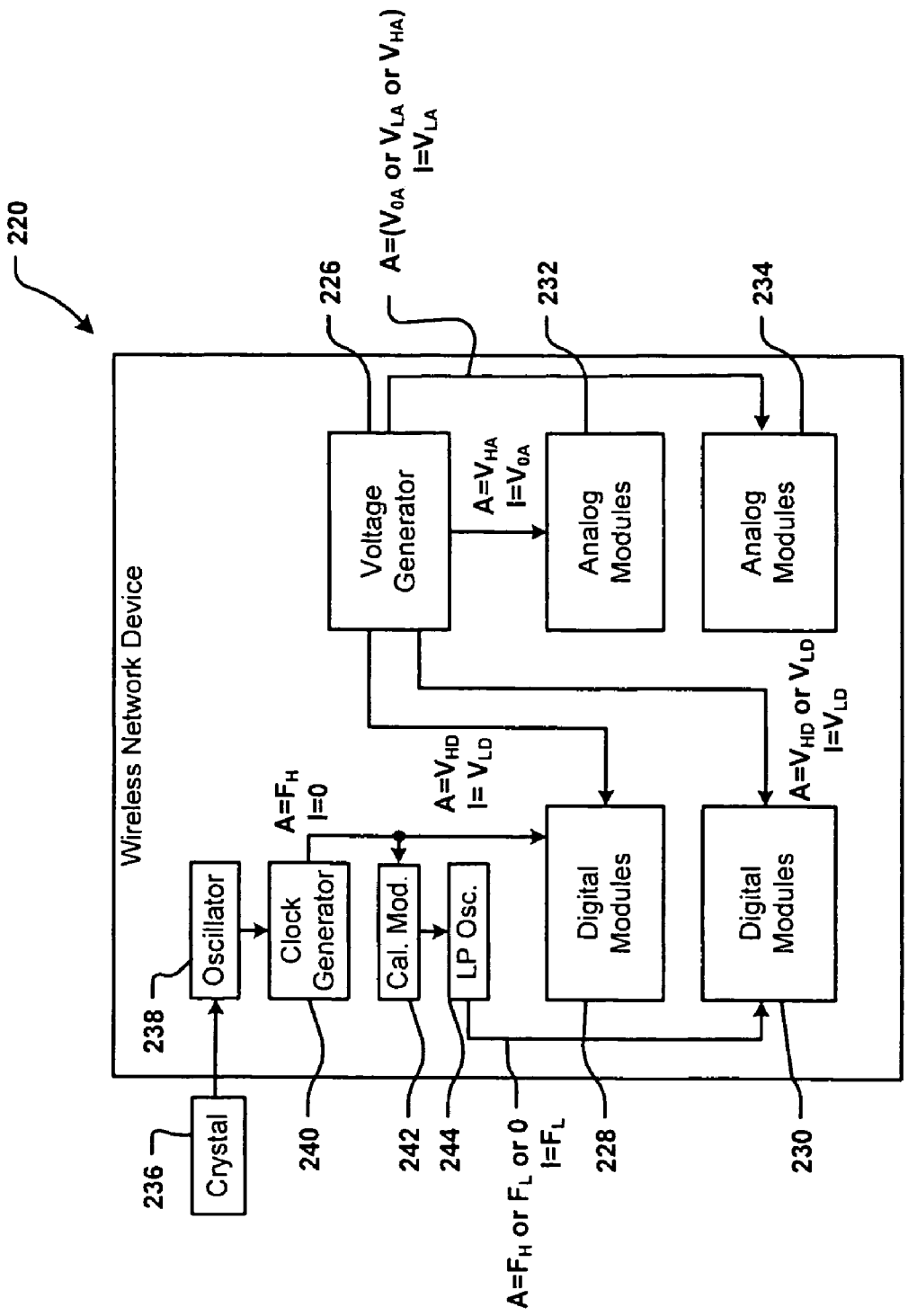

Referring now to FIG. 9B, an alternate clock generator is shown to include an external crystal 236 coupled to an oscillator 238, which outputs a reference frequency to a clock generator 240. An optional calibration module 242 may be used to calibrate a low power (LP) oscillator 244 using $F_H$ while in the active mode, as was previously described above. As can be appreciated, components of the wireless network device can be implemented as one or more integrated circuits.

Battery life is very important for network devices used in mobile applications such as smart phones, portable gaming devices, PDAs, etc. When in the inactive mode, the network device according to the present invention is capable of operating at sub-mA current consumption levels. Low power consumption also helps reduce form factor or size. While being physically small is an important feature, having sufficiently low current consumption to allow small form factor implementation is also necessary to avoid thermal issues. In other words, low power and small form factor go hand-in-hand.

A wireless network device typically spends most of its operating time in the inactive mode. While having low operating power consumption during the active mode is important, very low current consumption in the inactive mode may have a larger impact on battery life. To reduce current consumption down to sub-mA levels during the inactive mode, various current consumption factors need to be addressed including current consumption due to digital switching, analog components such as RF transceiver, ADCs, DACs, PLLs and CDRs (Clock-Data Recovery) circuits, reference clock sources such as on-chip or off-chip crystal oscillators, voltage regulators, bias circuits for analog building blocks and for voltage regulators, transistor sub-threshold and gate leakage currents in deep-submicron process technologies, etc.

To reduce current consumption due to digital switching, the digital system clocks are turned off during the inactive mode. Analog components such as the RF transceiver, analog to digital converter (ADC), digital to analog converter (DAC), phase-locked loops (PLLs) and clock data recovery (CDR) are shut down. Reference clock sources can be of various types. The most common types of reference clock sources are off-chip dedicated XOSCs for the wireless network device that can be shut off during inactive mode as shown in FIG. 9A, off-chip XOSC clock sources that cannot be shut down while the wireless network device goes into inactive mode, and on-chip oscillators with an external crystal that can be shut down during inactive mode as shown in FIG. 9B.

Power supply voltages are typically generated by voltage regulators. Sometimes these regulators may consume several mA of current. Bias circuits that provide bias voltages and currents to analog building blocks typically consume several mA of current. Transistor sub-threshold and gate leakage currents can be reduced substantially if the power supply voltage level is reduced. For example, a typical VDD=1.5V supply can be reduced to 1.3V or lower to reduce leakage current. The supply voltage can be reduced since there is minimum digital logic switching activities and minimum speed requirements in the inactive mode.

The present invention uses several techniques to achieve the desired characteristics. The clocks to all digital building blocks are shut down except to the power management module. This will substantially eliminate current consumption due to digital switching. A low speed clock that is substantially lower than the normal clock speed is used to run the power management module. In some implementations, a kHz range clock is used instead of a MHz range clock. This will also minimize the current consumption due to switching of the logic within the power management module.

An external or on-chip crystal oscillator that operates in the MHz range consumes several mA of current. This level of current consumption is not acceptable in inactive mode. Therefore, this oscillator must be shut off in order to achieve sub-mA of inactive current. In some implementations, an on-chip oscillator may be used instead of relying on an external reference clock source during the inactive mode. Typically, this reference clock is used to clock a timer that determines the wake up time for a subsequent beacon. However, since this on-chip oscillator is not crystal based, its accuracy is usually not as high. To achieve sufficient accuracy, a calibration process such as the calibration that is described above is used.

In some implementations, one or more power supply regulators that generate intermediate regulated voltages from the incoming 3.3V are shut down or put into a low current sleep mode. In sleep mode, the output current delivering capability of the regulator can be reduced to allow lower quiescent regulator current. Also, the output voltage can be reduced from the nominal value to help reduce transistor leakage current. This regulator sleep mode can be implemented by changing the operating mode of either on-chip or off-chip voltage regulator. Or, it can be implemented by switching the nominal regulator off and turning on one or more smaller, lower current regulators.

Prior to the transition of the regulators to the inactive mode, on-chip bias generation analog circuits as well as ADCs, DACs, PLLs and CDRs can all be shut off. A simple, low power reference voltage and bias current generator is used. In advanced deep submicron process technologies, in order to minimize the overall transistor leakage, digital $V_{DD}$ can be substantially reduced as long as it is sufficiently high to allow proper information retention of digital latches and flip-flops.

Figure 10A:
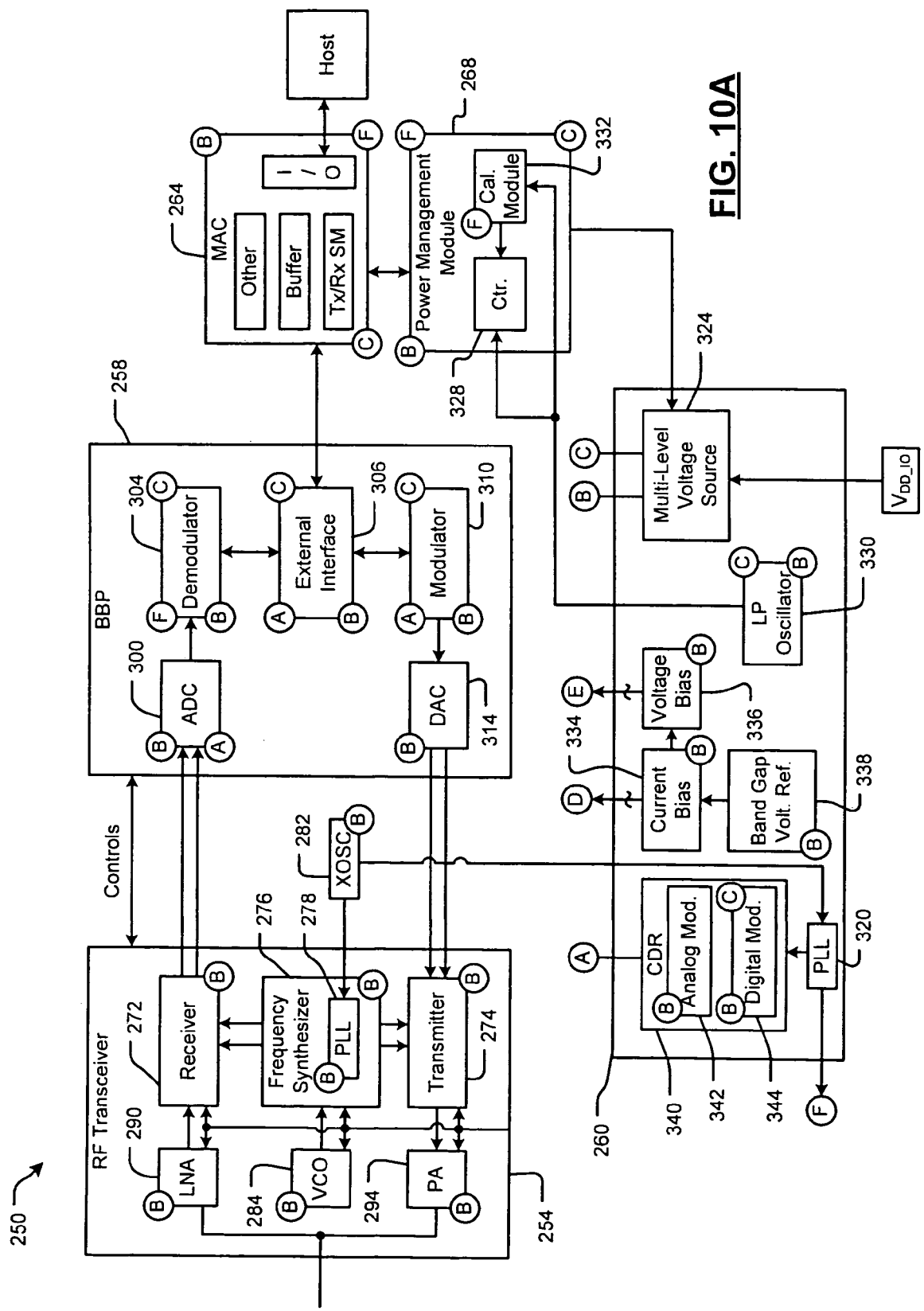
FIG. 10A is a functional block diagram of a wireless network device according to some implementations of the present invention.

Referring now to FIG. 10A, a wireless network device 250 according to some implementations of the present invention is shown to include an RF transceiver module 254, a baseband processor module 258, a power and clock module 260, a medium access control (MAC) module 264 and a power management module 268. The RF transceiver 254 includes a receiver 272 and a transmitter 274. While not shown, the network device also includes a processor and other standard components such as those shown in FIG. 3.

In some implementations, a higher digital voltage level is used to power both analog and digital modules during the active mode. Alternately, a higher digital voltage level and an analog voltage level are used during the active mode. During the inactive mode, the digital modules are powered by a lower digital level to maintain logic states. The analog modules may continue to receive either the higher digital voltage level and/or the analog voltage level during the inactive mode, or may have power removed completely. In this case, a power management module generates a control signal during the inactive mode, which is used to turn off the analog modules.

A frequency synthesizer 276 includes a phase locked loop (PLL) 278 that receives a first reference frequency from an oscillator such as a crystal oscillator 282. The frequency synthesizer 276 also contains a voltage controlled oscillator (VCO) 284, which provides an adjustable frequency output based on an input signal thereto. The frequency synthesizer 276 generates RF and IF output signals for the receiver and transmitter 272 and 274, respectively.

During receiver operation, an input of a low noise amplifier (LNA) 290 receives signals from an antenna (not shown), amplifies the signals and outputs them to the receiver 272. During transmitter operation, an output of the transmitter 274 is received by a power amplifier (PA) 294, which outputs amplified signals to the antenna.

On the receiver side, the BBP 258 includes an analog to digital converter (ADC) 300 that receives in-phase (I) and quadrature (Q) signals from the receiver 272. The ADC 300 communicates with a demodulator 304, which demodulates the signals. An output of the demodulator 304 communicates with an external interface 306, which communicates with the MAC 264. On the transmitter side, the MAC 264 sends signals to the external interface 306, which are modulated by a modulator 310 and output to a digital to analog converter (DAC) 314. The DAC 314 outputs I and Q signals to the transmitter 274. The BBP 258 also may include a PLL 320.

The power and clock module 260 includes a multi-level voltage source 324 that receives an input voltage such as VDD and a mode signal and outputs two or more voltage levels. The power and clock module 260 also includes a low power oscillator 330. The power management module 268 along with the MAC 264 and processor (not shown) selects an operating mode of the wireless network device 250. In this implementation, the operating modes include active and inactive modes, although additional modes may be provided. The power management module 268 may also be located in the power and clock module 260.

Figure 10B:
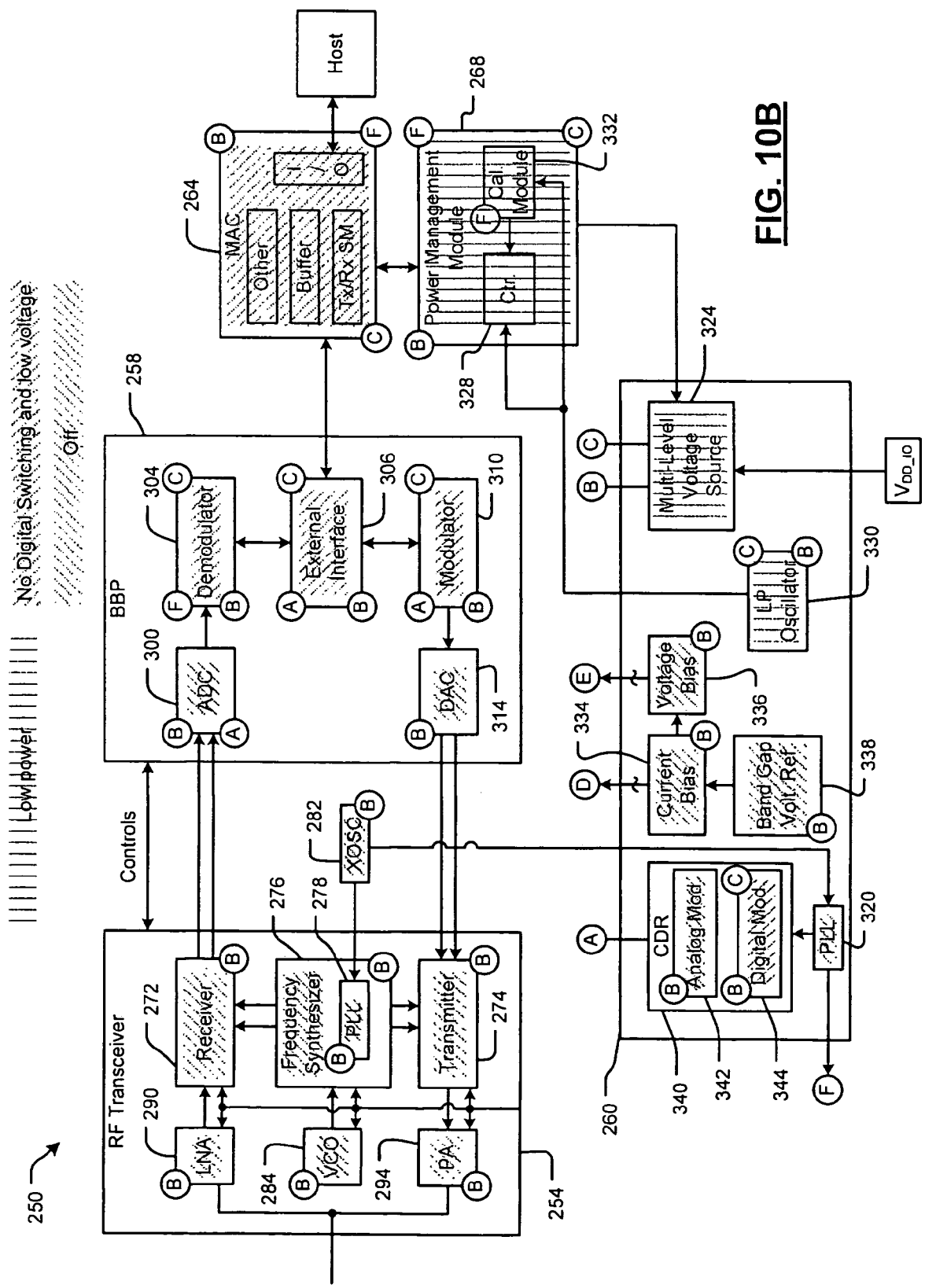
FIG. 10B illustrates the wireless network device of FIG. 10 in an inactive mode.

In FIGS. 10A and 10B, connections between the CDR module 340 and other circuits are identified by the reference letter A. Similarly connections between the multi-level voltage source and other modules are identified by letters B and C. While analog reference voltage B is shown as being supplied to the analog modules in the RF device, another analog reference source can be used instead of or in addition to the reference voltage B.

A calibration module 332 that is associated with the power management module 268 is optionally used to calibrate the duration of the inactive mode. The calibration module 332 receives an output of the LP oscillator 330 and the PLL 320 and calibrates a counter value used to calculate the duration of the inactive mode. The calibration can be performed periodically, on an event basis, randomly, before transitioning to the inactive mode and/or on any other suitable basis.

The power and clock module 260 further includes current and voltage bias circuits 334 and 336, respectively, that provide current and/or voltage biases to various circuits and/or modules (connections not shown) in the wireless network device 250. The current bias circuit 334 may include one or more off-chip calibration resistors (not shown) and the voltage bias circuit may include one or more on-chip resistors (not shown). A band gap voltage reference 338 may be used to bias the current bias circuit 334.

A clock data recovery (CDR) module 340 performs clock recovery and includes analog and digital modules 342 and 344, respectively or only digital modules. An output of phase lock loop (PLL) 320 is coupled to the CDR module 340.

Referring now to FIG. 10B, one implementation of the wireless network device 250 in an inactive mode is shown. The power management module 268 switches the network device 250 between active and inactive modes. The power management module 268 generates the mode control signal that transitions the multi-level voltage source 324 to the lower voltage level for the inactive mode. Part of the multi-level voltage source may be turned off and part may remain on. Voltage signals to components of the RF transceiver 254, the XOSC 282, the current and voltage bias circuits 334 and 336, the ADC 300, the BG voltage reference 388 and the DAC 314, and the PLLs 278 and 320 are turned off during the inactive mode. Alternately, the voltage signals are still provided during the inactive mode and a control signal turns these devices off. The PLLs do not generate output signals and the clock signals that are based thereon are also turned off, which reduces losses associated with digital switching. In addition, a lower voltage bias is supplied to digital modules to reduce power consumption while maintaining their logic states until the active mode. The LP oscillator 330 receives the low voltage and generates an output frequency that is used to clock the counter 328 during the inactive mode. When a sufficient time has passed, the counter 328 triggers the power management module 268, which switches the network device 250 back to the active mode.

The digital VDD supply may include a Power On Reset (POR) circuit module. As VDD is reduced to reduce leakage current, VDD may fall below the threshold voltage of the Power On Reset (POR) module. To avoid this issue, the digital VDD POR can be disabled during the inactive mode to prevent logic reset of the system, as will be described further below in conjunction with FIGS. 11-14.

Figure 11A:
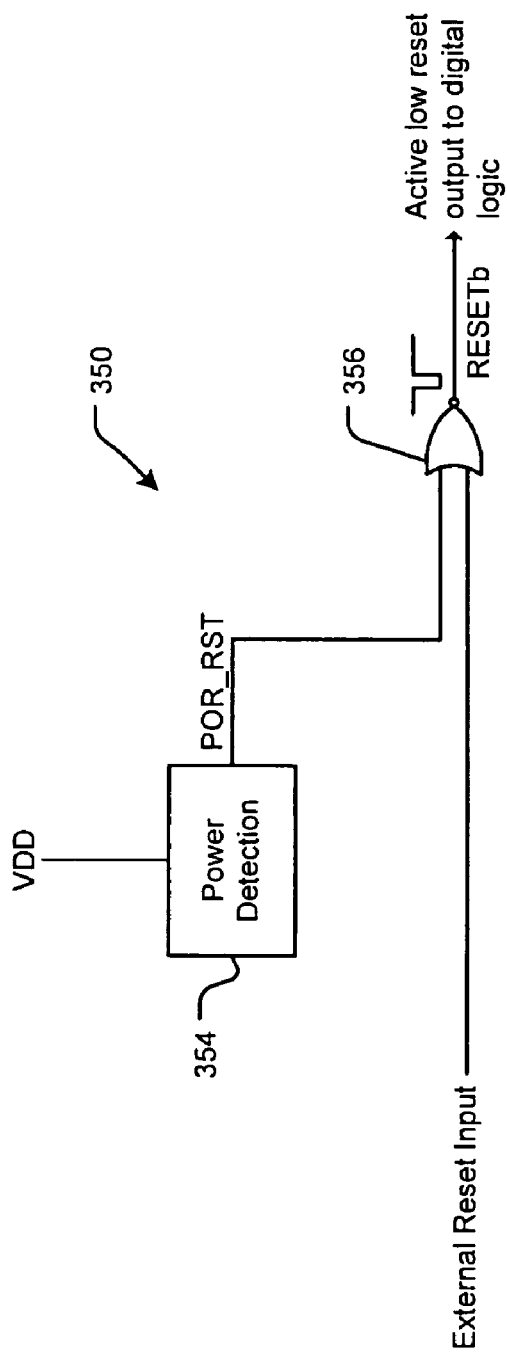
FIG. 11A illustrates a power on reset circuit.
Figure 11B:
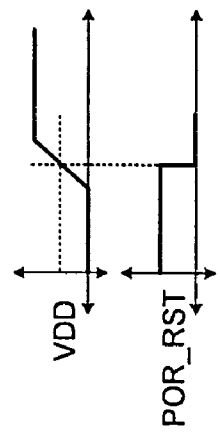
FIG. 11B illustrates $V_{DD}$ and power on reset signals.

Referring now to FIGS. 11A and 11B, a power on reset circuit 350 is shown. A power detection module 354 receives $V_{DD}$ and outputs a POR_RST signal. When VDD exceeds a threshold, the POR_RST signal changes state, e.g. POR_RST goes low (or high). A NOR gate 356 receives an external reset input and the POR_RST signal.

Figure 12:
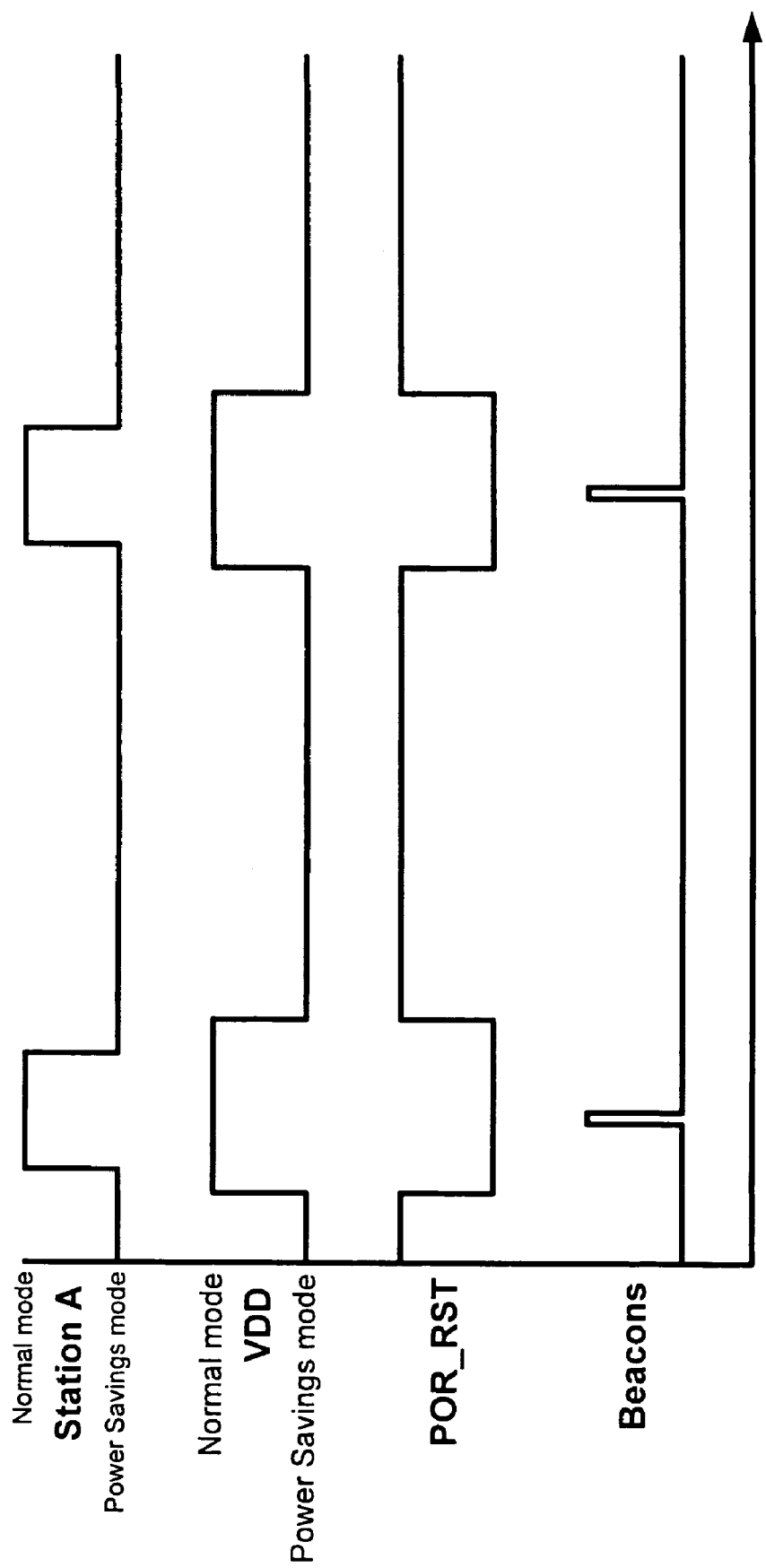
FIG. 12 illustrates station, $V_{DD}$, power on reset and beacon signals.

Referring now to FIG. 12, station, $V_{DD}$, power on reset and beacon signals are shown. $V_{DD}$ may be reduced during inactive mode to reduce the amount of leakage current. If $V_{DD}$ drops below the threshold voltage of the POR circuit during active or inactive modes (or if any ringing on the supply causes an undershoot below the threshold), the POR circuit 350 may trigger a logic reset of the system.

Figure 13:
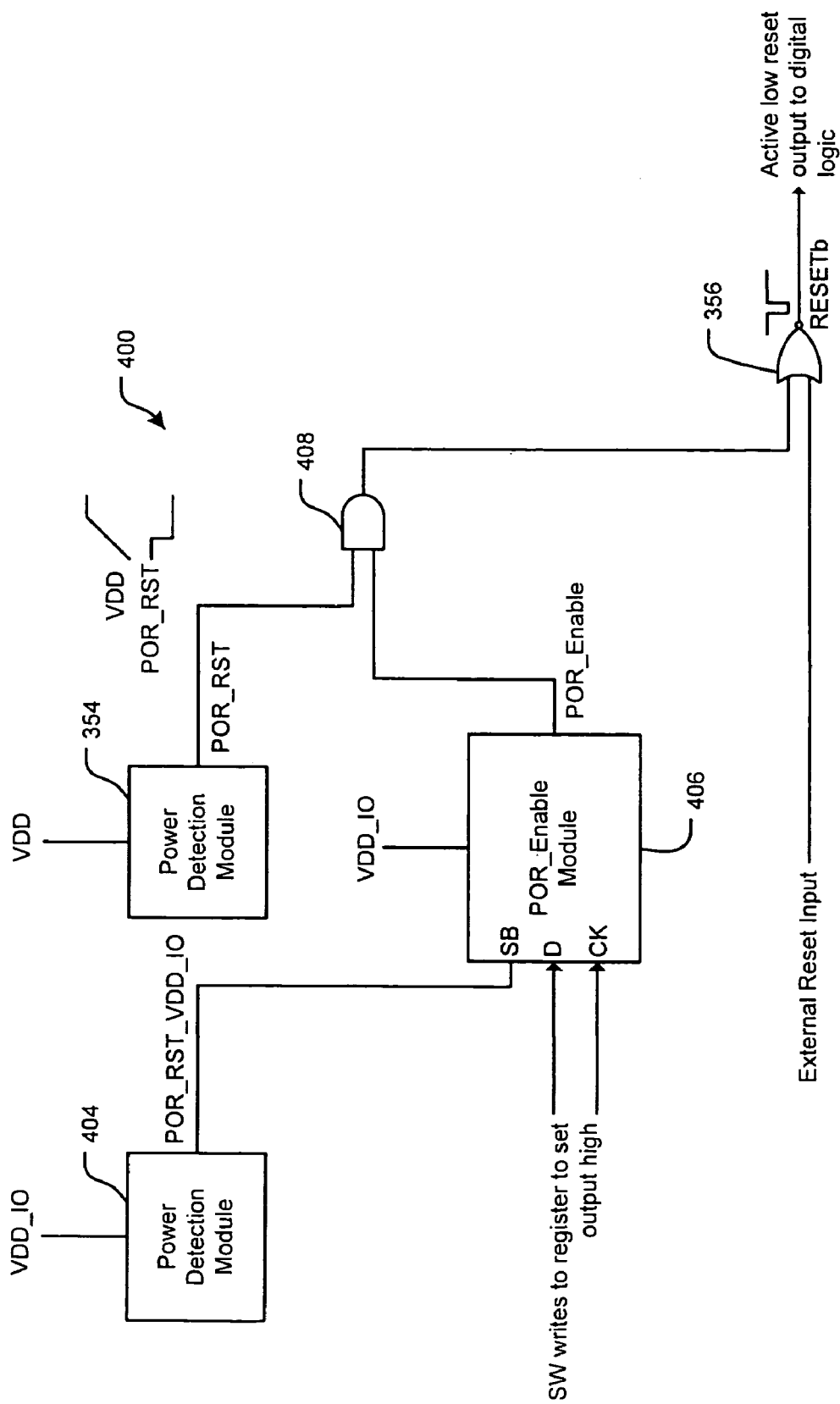
FIG. 13 illustrates a modified power on reset circuit according to some implementations of the present invention.
Figure 14:
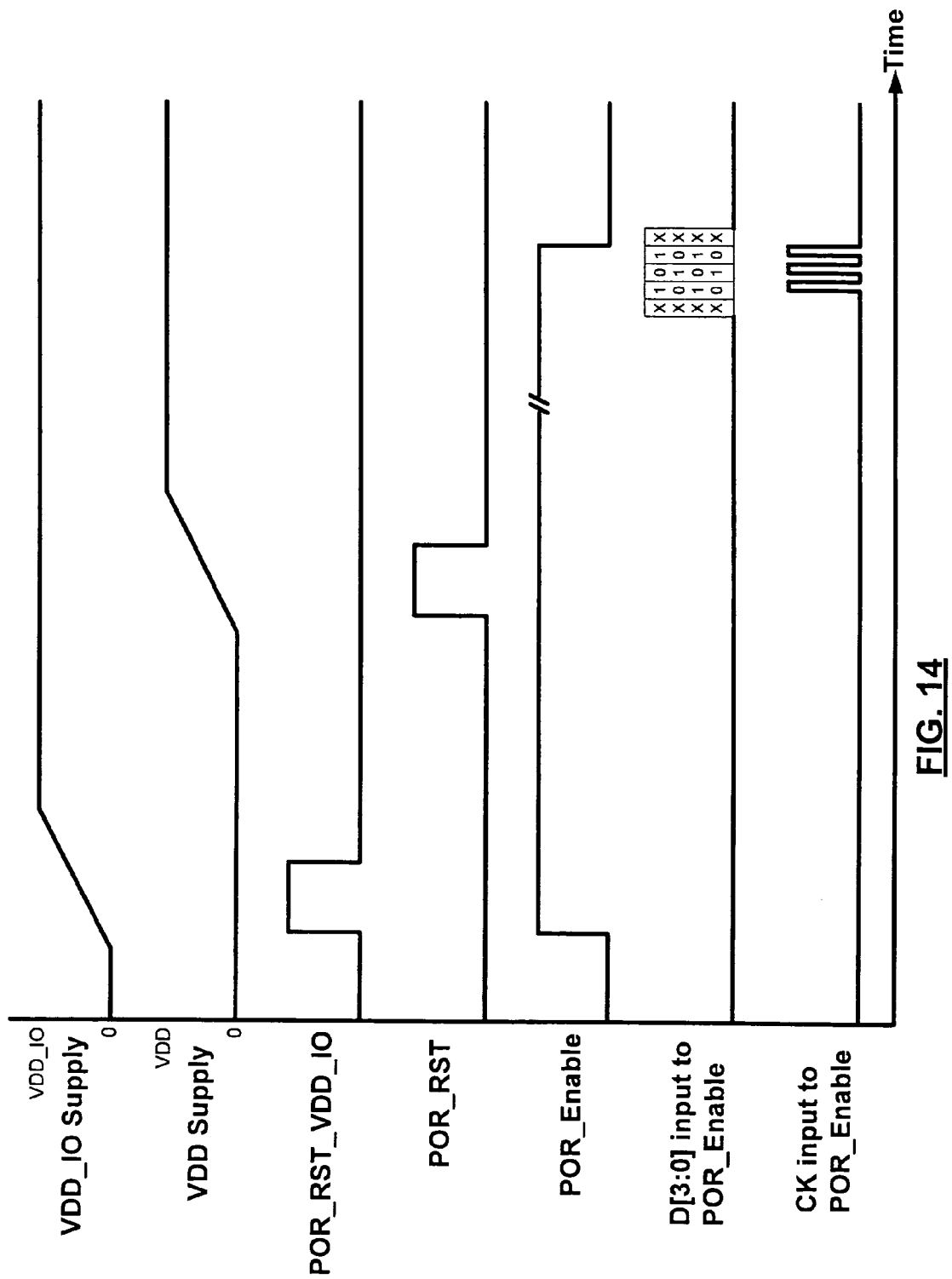
FIG. 14 illustrates various signals associated with the modified power on reset circuit of FIG. 13.

Referring now to FIGS. 13 and 14, a modified power on reset circuit 400 according to some implementations of the present invention is shown. The modified power on reset circuit 400 includes the first power detection module 354, which operates as described above. A second power detection module 404 monitors VDD_IO and generates POR_RST_VDD_IO signal that changes state when VDD_IO goes high (note that POR_RST_VDD_IO is low initially since the wireless device is not receiving power). A POR enable module 406 monitors data (D) and clock (CLK) signals in addition to the POR_RST_VDD_IO output of the second power detection module 404 and VDD_IO. The POR enable module 406 generates a POR_Enable signal when POR_RST_VDD_IO goes high. POR_Enable remains enabled until cleared, as will be described below. The POR_RST_VDD_IO signal is resetting the state of POR_Enable. The reset state is to set POR_Enable high to enable POR_RST. The process of clocking the appropriate data into POR_Enable Module serves to clear the enable.

VDD_IO will rise first, causing POR_RST_VDD_IO to initially go high, then transition low when the VDD_IO level has reached a certain threshold. A VDD_IO register in the POR_Enable module 406 will be set when POR_RST_VDD_IO is at a high state. VDD_IO does not change voltage levels during transitions between active and inactive modes while VDD does go low during the inactive mode.

$V_{DD}$ will rise after VDD_IO and cause the first power detection module 354 to change the state of POR_RST (e.g. POR_RST goes high initially during the VDD rise, then low after VDD passes a threshold). The POR_RST and POR_Enable signals are output to an AND gate 408. When both signals are high, they are output to the NOR gate 356. Active low reset output resets digital logic. Prior to entering the inactive mode, software will change the state of the VDD_IO register to '0', which causes POR-Enable to go low and prevents the VDD power detection module from resetting digital logic when VDD goes below the threshold.

At some point after initial resets and prior to enabling inactive modes, the processor and software will program the POR_Enable signal to go low. This is done by a sequence of programming steps to avoid a false trigger of this signal. For example in some implementations, data bits D[3:0] are sequentially set equal to 1010, 0101 and 1010, respectively, on three successive clock signals, although other data patterns and/or approaches can be used. When this pattern occurs, POR_Enable is transitioned low, which prevents POR_RST from triggering a logic reset when VDD goes below the threshold.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A wireless network device having active and inactive modes, comprising:
   a clock generating module that generates a first clock signal having a first clock rate;
   a voltage supply module that generates a first voltage level and a second voltage level that is less than said first voltage level;
   a first digital module that receives said first clock rate and said first voltage level during said active mode, that receives said second voltage level during said inactive mode and that does not receive said first clock signal during said inactive mode; and
   a first analog module that communicates with said voltage supply module and that has reduced current consumption during said inactive mode,
   wherein the wireless network device is a wireless network communication device.

2. The wireless device of claim 1 wherein said voltage supply module generates a third voltage level and said first analog module receives said third voltage level during said active mode.

3. The wireless device of claim 1 wherein said first analog module reduces said current consumption during said inactive mode in response to a control signal.

4. The wireless device of claim 1 wherein said first analog module receives said first voltage level during both said active and inactive modes and wherein said first analog module reduces said current consumption during said inactive mode in response to a control signal.

5. The wireless device of claim 1 wherein said clock generating module generates a second clock rate.

6. The wireless device of claim 5 wherein said second clock rate is less than said first clock rate.

7. The wireless device of claim 5 further comprising a second digital module that receives said second clock signal during said inactive mode.

8. The wireless device of claim 7 wherein said second digital module receives said second clock signal during said active mode.

9. The wireless device of claim 7 wherein said second digital module receives said second voltage level during said inactive mode.

10. The wireless device of claim 7 wherein said second digital module includes a power management module that includes a counter.

11. The wireless device of claim 5 wherein said clock generating module includes:
    a crystal oscillator that generates a first reference frequency, wherein said first clock rate is based on said first reference frequency; and
    a low power oscillator that generates a second reference frequency, wherein said second clock rate is based on said second reference frequency.

12. The wireless device of claim 1 wherein said first digital module includes at least one of a modulator, a baseband processor, a demodulator, a medium access control (MAC) module, and a digital module in a clock data recovery (CDR) module.

13. The wireless device of claim 1 wherein said first analog module includes at least one of an RF transceiver, a crystal oscillator, an analog to digital converter (ADC), a digital to analog converter (DAC), a current bias circuit, a voltage bias circuit, and an analog module in a clock data recovery (CDR) module.

14. The wireless device of claim 1 further comprising a second analog module that receives said second voltage level during said active and inactive modes.

15. The wireless device of claim 14 wherein said second analog module includes a low power oscillator.

16. The wireless device of claim 1 further comprising a power on reset module that prevents a logic reset of said first digital module due to operation at said second voltage level during said inactive mode.

17. A method for operating a wireless network device having active and inactive modes, comprising:
    generating a first clock signal having a first clock rate;
    generating a first voltage level and a second voltage level that is less than said first voltage level;
    receiving said first clock rate and said first voltage level at a first digital module of the wireless network device during said active mode;
    receiving said second voltage level during said inactive mode at the first digital module, which does not receive said first clock signal during said inactive mode; and
    reducing current consumption of a first analog module of the wireless network device during said inactive mode,
    wherein the wireless network device is a wireless network communication device.

18. The method of claim 17 further comprising:
    generating a third voltage level; and
    receiving said third voltage level said first analog module during said active mode.

19. The method of claim 17 further comprising reducing said current consumption of said first analog module during said inactive mode in response to a control signal.

20. The method of claim 17 further comprising:
    receiving said first voltage level at said first analog module during both said active and inactive modes; and
    reducing said current consumption at said first analog module during said inactive mode in response to a control signal.

21. The method of claim 17 further comprising generating a second clock rate.

22. The method of claim 21 wherein said second clock rate is less than said first clock rate.

23. The method of claim 21 further comprising:
    generating a first reference frequency, wherein said first clock rate is based on said first reference frequency; and
    generating a second reference frequency, wherein said second clock rate is based on said second reference frequency.

24. The method of claim 17 wherein said first digital module includes at least one of a modulator, a baseband processor, a demodulator, a medium access control (MAC) module, and a digital module in a clock data recovery (CDR) method.

25. The method of claim 17 wherein said first analog module includes at least one of an RF transceiver, a crystal oscillator, an analog to digital converter (ADC), a digital to analog converter (DAC), a current bias circuit, a voltage bias circuit, and an analog method in a clock data recovery (CDR) method.

26. The method of claim 21 further comprising receiving said second clock signal at a second digital module during said inactive mode.

27. The method of claim 26 further comprising receiving said second clock signal said second digital module during said active mode.

28. The method of claim 26 further comprising receiving said second voltage level at said second digital module during said inactive mode.

29. The method of claim 26 further comprising managing power at said second digital module.

30. The method of claim 17 further comprising receiving said second voltage level at said second analog module during said active and inactive modes.

31. The method of claim 30 wherein said second analog method includes a low power oscillator.

32. The method of claim 17 further comprising preventing a logic reset of said first digital module due to operation at said second voltage level during said inactive mode.

* * * * *

UNITED STATES PATENT AND TRADEMARK OFFICE
CERTIFICATE OF CORRECTION

PATENT NO. : 7,454,634 B1 Page 1 of 1
APPLICATION NO. : 11/070481
DATED : November 18, 2008
INVENTOR(S) : Timothy Donovan et al.

It is certified that error appears in the above-identified patent and that said Letters Patent is hereby corrected as shown below:

Column 2, Line 63    Insert -- at -- after "level"
Column 3, Line 18    Insert -- at -- after "signal"
Column 16, Line 45    Delete "POR-Enable" and insert -- POR_Enable --
Column 18, Line 27    Insert -- at -- after "level"
Column 18, Line 63    Insert -- at -- after "signal"

Signed and Sealed this

Twenty-fourth Day of February, 2009

JOHN DOLL
*Acting Director of the United States Patent and Trademark Office*